US008890859B2

(12) United States Patent

Toyotaka et al.

(10) Patent No.: US 8,890,859 B2

(45) Date of Patent: Nov. 18, 2014

(54) LIQUID CRYSTAL DISPLAY DEVICE AND DRIVING METHOD OF THE SAME

(71) Applicant: Semiconductor Energy Laboratory Co., Ltd., Atsugi (JP)

(72) Inventors: Kouhei Toyotaka, Kanagawa (JP); Hiroyuki Miyake, Kanagawa (JP); Ryo Arasawa, Kanagawa (JP); Koji Kusunoki, Kanagawa (JP); Tsutomu Murakawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/219,275

(22) Filed: Mar. 19, 2014

(65) Prior Publication Data

US 2014/0204073 A1 Jul. 24, 2014

Related U.S. Application Data

(63) Continuation of application No. 13/193,981, filed on Jul. 29, 2011, now Pat. No. 8,692,823.

(30) Foreign Application Priority Data

Aug. 6, 2010 (JP) ................................ 2010-178132

(51) Int. Cl.
*G06F 3/038* (2013.01)
*G09G 3/36* (2006.01)

(52) U.S. Cl.
CPC .................................. *G09G 3/3648* (2013.01)
USPC ........................................................ 345/212

(58) Field of Classification Search
USPC ............... 345/87–100, 204, 211–213; 361/56
See application file for complete search history.

(56) References Cited

U.S. PATENT DOCUMENTS 5,671,026 A * 9/1997 Shiraki et al. ................... 349/40
5,731,856 A 3/1998 Kim (Continued)

FOREIGN PATENT DOCUMENTS

CN 001077295 C 1/2002
CN 101645237 A 2/2010

(Continued)

OTHER PUBLICATIONS

Ohara, H et al., "21.3: 4.0 In. QVGA Amoled Display Using In—Ga—Zn—Oxide TFTs With a Novel Passivation Layer," SID Digest '09 : SID International Symposium Digest of Technical Papers, May 31, 2009, pp. 284-287.

(Continued)

*Primary Examiner* — Rodney Amadiz
(74) *Attorney, Agent, or Firm* — Fish & Richardson P.C.

(57) ABSTRACT

Provided is a liquid crystal display device having a pixel including a transistor and a liquid crystal element and a protection circuit electrically connected to one of a source and a drain of the transistor through a data line. The protection circuit includes a first terminal supplied with a first power supply potential and a second terminal supplied with a second power supply potential higher than the first power supply potential. In a moving image display mode, an image signal is input from the data line to the liquid crystal element through the transistor, and the first power supply potential is set at the first potential. In a still image display mode, supply of the image signal is stopped, and the first power supply potential is set at the second potential. The second potential is substantially the same as the minimum value of the image signal.

17 Claims, 13 Drawing Sheets

(56) References Cited

U.S. PATENT DOCUMENTS

| | | | | |
|---|---|---|---|---|
| 5,744,864 | A | 4/1998 | Cillessen | |
| 5,926,234 | A | 7/1999 | Shiraki et al. | |
| 6,169,532 | B1 | 1/2001 | Sumi | |
| 6,294,274 | B1 | 9/2001 | Kawazoe | |
| 6,317,109 | B1 | 11/2001 | Lee | |
| 6,392,622 | B1 * | 5/2002 | Ozawa | 345/92 |
| 6,563,174 | B2 | 5/2003 | Kawasaki | |
| 6,727,522 | B1 | 4/2004 | Kawasaki | |
| 6,795,066 | B2 | 9/2004 | Tanaka | |
| 6,891,523 | B2 * | 5/2005 | Ozawa | 345/87 |
| 7,049,190 | B2 | 5/2006 | Takeda | |
| 7,061,014 | B2 | 6/2006 | Hosono | |
| 7,064,346 | B2 | 6/2006 | Kawasaki | |
| 7,095,391 | B2 | 8/2006 | Lee | |
| 7,105,868 | B2 | 9/2006 | Nause | |
| 7,211,825 | B2 | 5/2007 | Shih | |
| 7,282,782 | B2 | 10/2007 | Hoffman | |
| 7,297,977 | B2 | 11/2007 | Hoffman | |
| 7,323,356 | B2 | 1/2008 | Hosono | |
| 7,385,224 | B2 | 6/2008 | Ishii | |
| 7,402,506 | B2 | 7/2008 | Levy | |
| 7,411,209 | B2 | 8/2008 | Endo | |
| 7,453,065 | B2 | 11/2008 | Saito | |
| 7,453,087 | B2 | 11/2008 | Iwasaki | |
| 7,462,862 | B2 | 12/2008 | Hoffman | |
| 7,468,304 | B2 | 12/2008 | Kaji | |
| 7,499,012 | B2 | 3/2009 | Yoshihara | |
| 7,501,293 | B2 | 3/2009 | Ito | |
| 7,518,592 | B2 | 4/2009 | Koyama | |
| 7,601,984 | B2 | 10/2009 | Sano | |
| 7,674,650 | B2 | 3/2010 | Akimoto | |
| 7,732,819 | B2 | 6/2010 | Akimoto | |
| 7,994,500 | B2 | 8/2011 | Kim | |
| 8,058,645 | B2 | 11/2011 | Jeong | |
| 8,081,148 | B2 * | 12/2011 | Abe et al. | 345/92 |
| 8,148,779 | B2 | 4/2012 | Jeong | |
| 8,188,480 | B2 | 5/2012 | Itai | |
| 8,199,078 | B2 | 6/2012 | Handa et al. | |
| 8,202,365 | B2 | 6/2012 | Umeda | |
| 8,203,143 | B2 | 6/2012 | Imai | |
| 8,493,302 | B2 | 7/2013 | Sekine | |
| 2001/0046027 | A1 | 11/2001 | Tai | |
| 2002/0056838 | A1 | 5/2002 | Ogawa | |
| 2002/0132454 | A1 | 9/2002 | Ohtsu | |
| 2003/0189401 | A1 | 10/2003 | Kido | |
| 2003/0218222 | A1 | 11/2003 | Wager | |
| 2004/0038446 | A1 | 2/2004 | Takeda | |
| 2004/0127038 | A1 | 7/2004 | Carcia | |
| 2005/0017302 | A1 | 1/2005 | Hoffman | |
| 2005/0199959 | A1 | 9/2005 | Chiang | |
| 2006/0035452 | A1 | 2/2006 | Carcia | |
| 2006/0043377 | A1 | 3/2006 | Hoffman | |
| 2006/0077138 | A1 | 4/2006 | Kim | |
| 2006/0091793 | A1 | 5/2006 | Baude | |
| 2006/0108529 | A1 | 5/2006 | Saito | |
| 2006/0108636 | A1 | 5/2006 | Sano | |
| 2006/0110867 | A1 | 5/2006 | Yabuta | |
| 2006/0113536 | A1 | 6/2006 | Kumomi | |
| 2006/0113539 | A1 | 6/2006 | Sano | |
| 2006/0113549 | A1 | 6/2006 | Den | |
| 2006/0113565 | A1 | 6/2006 | Abe | |
| 2006/0169973 | A1 | 8/2006 | Isa | |
| 2006/0170111 | A1 | 8/2006 | Isa | |
| 2006/0197092 | A1 | 9/2006 | Hoffman | |
| 2006/0208977 | A1 | 9/2006 | Kimura | |
| 2006/0228974 | A1 | 10/2006 | Thelss | |
| 2006/0231882 | A1 | 10/2006 | Kim | |
| 2006/0238135 | A1 | 10/2006 | Kimura | |
| 2006/0244107 | A1 | 11/2006 | Sugihara | |
| 2006/0284171 | A1 | 12/2006 | Levy | |
| 2006/0284172 | A1 | 12/2006 | Ishii | |
| 2006/0292777 | A1 | 12/2006 | Dunbar | |
| 2007/0024187 | A1 | 2/2007 | Shin | |
| 2007/0046191 | A1 | 3/2007 | Saito | |
| 2007/0052025 | A1 | 3/2007 | Yabuta | |
| 2007/0054507 | A1 | 3/2007 | Kaji | |
| 2007/0090365 | A1 | 4/2007 | Hayashi | |
| 2007/0108446 | A1 | 5/2007 | Akimoto | |
| 2007/0152217 | A1 | 7/2007 | Lai | |
| 2007/0172591 | A1 | 7/2007 | Seo | |
| 2007/0187678 | A1 | 8/2007 | Hirao | |
| 2007/0187760 | A1 | 8/2007 | Furuta | |
| 2007/0194379 | A1 | 8/2007 | Hosono | |
| 2007/0252928 | A1 | 11/2007 | Ito | |
| 2007/0272922 | A1 | 11/2007 | Kim | |
| 2007/0287296 | A1 | 12/2007 | Chang | |
| 2008/0006877 | A1 | 1/2008 | Mardilovich | |
| 2008/0024946 | A1 * | 1/2008 | Sato | 361/56 |
| 2008/0038882 | A1 | 2/2008 | Takechi | |
| 2008/0038929 | A1 | 2/2008 | Chang | |
| 2008/0050595 | A1 | 2/2008 | Nakagawara | |
| 2008/0073653 | A1 | 3/2008 | Iwasaki | |
| 2008/0083950 | A1 | 4/2008 | Pan | |
| 2008/0106191 | A1 | 5/2008 | Kawase | |
| 2008/0128689 | A1 | 6/2008 | Lee | |
| 2008/0129195 | A1 | 6/2008 | Ishizaki | |
| 2008/0166834 | A1 | 7/2008 | Kim | |
| 2008/0182358 | A1 | 7/2008 | Cowdery-Corvan | |
| 2008/0224133 | A1 | 9/2008 | Park | |
| 2008/0239180 | A1 | 10/2008 | Sekine | |
| 2008/0254569 | A1 | 10/2008 | Hoffman | |
| 2008/0258139 | A1 | 10/2008 | Ito | |
| 2008/0258140 | A1 | 10/2008 | Lee | |
| 2008/0258141 | A1 | 10/2008 | Park | |
| 2008/0258143 | A1 | 10/2008 | Kim | |
| 2008/0296568 | A1 | 12/2008 | Ryu | |
| 2009/0068773 | A1 | 3/2009 | Lai | |
| 2009/0073325 | A1 | 3/2009 | Kuwabara | |
| 2009/0114910 | A1 | 5/2009 | Chang | |
| 2009/0134399 | A1 | 5/2009 | Sakakura | |
| 2009/0152506 | A1 | 6/2009 | Umeda | |
| 2009/0152541 | A1 | 6/2009 | Maekawa | |
| 2009/0278122 | A1 | 11/2009 | Hosono | |
| 2009/0280600 | A1 | 11/2009 | Hosono | |
| 2010/0033510 | A1 | 2/2010 | Handa | |
| 2010/0065844 | A1 | 3/2010 | Tokunaga | |
| 2010/0092800 | A1 | 4/2010 | Itagaki | |
| 2010/0109002 | A1 | 5/2010 | Itagaki | |
| 2010/0320458 | A1 | 12/2010 | Umeda | |
| 2010/0320459 | A1 | 12/2010 | Umeda | |
| 2011/0193083 | A1 | 8/2011 | Kim | |
| 2011/0215328 | A1 | 9/2011 | Morosawa | |
| 2012/0119205 | A1 | 5/2012 | Taniguchi | |

FOREIGN PATENT DOCUMENTS

| | | | |
|---|---|---|---|
| EP | 1 737 044 | A1 | 12/2006 |
| EP | 2 226 847 | A2 | 9/2010 |
| JP | 60-198861 | A | 10/1985 |
| JP | 63-210022 | A | 8/1988 |
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 05-251705 | A | 9/1993 |
| JP | 07-092448 | A | 4/1995 |
| JP | 08-264794 | A | 10/1996 |
| JP | 11-505377 | A | 5/1999 |
| JP | 2000-044236 | A | 2/2000 |
| JP | 2000-150900 | A | 5/2000 |
| JP | 2002-076356 | A | 3/2002 |
| JP | 2002-278523 | A | 9/2002 |
| JP | 2002-289859 | A | 10/2002 |
| JP | 2003-086000 | A | 3/2003 |
| JP | 2003-086808 | A | 3/2003 |
| JP | 2004-103957 | A | 4/2004 |
| JP | 2004-273614 | A | 9/2004 |
| JP | 2004-273732 | A | 9/2004 |
| JP | 2005-283775 | A | 10/2005 |
| JP | 2009-231613 | A | 10/2009 |
| JP | 2010-016347 | A | 1/2010 |
| JP | 4415062 | A | 2/2010 |
| JP | 2010-067954 | A | 3/2010 |

(56) References Cited

FOREIGN PATENT DOCUMENTS

| | | | |
|---|---|---|---|
| JP | 2010-177431 | A | 8/2010 |
| JP | 4571221 | A | 10/2010 |
| JP | 2012-160679 | A | 8/2012 |
| WO | WO 2004/114391 | A1 | 12/2004 |
| WO | WO 2008/133345 | A1 | 11/2008 |

OTHER PUBLICATIONS

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In-Ga-Zn-Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size Amoled," AM-FPD '08 Digest of Technical Papers, Jul. 2, 2008, pp. 275-278.

Park, S et al., "Challenge to Future Displays: Transparent Am-Oled Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. Amoled Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA Amoled Driven by the Threshold Voltage Controlled Amorphous Gizo (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of Igzo Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Nakayama et al., "17a-TL-8 Effect of GaO Layer on IGZO-TFT Channel," Extended Abstracts (The 57th Spring Meeting 2010), The Japan Society of Applied Physics and Related Societies, Mar. 17, 2010, p. 21-008 (with full English translation).

Amano, S et al., "43.4: Low Power LC Display Using In—Ga—Zn—Oxide TFTs Based on Variable Frame Frequency," SID Digest '10 : SID International Symposium Digest of Technical Papers, 2010, pp. 626-629.

Asakuma, N. et al., "Crystallization and Reduction of Sol—Gel—Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for Amoled Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced At Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, Ret al., "42.1: Invited Paper: Improved Amorphous In—Ga—Zn—O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDS," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

(56) References Cited

OTHER PUBLICATIONS

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda., T et al., "Full-Functional System Liquid Crystal Display Using Cg-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, No. 16, pp. 165202-1-165202-22.
Janotti, A et al., "Oxygen Vacancles in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission Amoled Display on Plastic Film and Its Bending Properties," SID Digest '09 : SID International Symposium Digest of Technical Papers, May 31, 2009, pp. 983-985.
Kanno, H et al., "White Stacked Electrophosphorecent Organic Light-Emitting Devices Employing MOO3 As a Charge-Generation Layer," Adv. Mater. (Advanced Materials), 2006, vol. 18, No. 3, pp. 339-342.
Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.
Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.
Kikuchi, H et al., "Polymer-Stabilized Liquid Crystal Blue Phases,", Nature Materials, Sep. 1, 2002, vol. 1, pp. 64-68.
Kim, S et al., "High-Performance oxide thin film transistors passivated by various gas plasmas," The Electrochemical Society, 214th ECS Meeting, 2008, No. 2317, 1 page.
Kimizuka, N et al., "Spinel, YBFE2O4, and YB2FE3O7 Types of Structures for Compounds in the IN2O3 and SC2O3-A2O3-Bo Systems [A; Fe, Ga, or Al; B: Mg, Mn, Fe, Ni, Cu, or Zn] at Temperatures Over 1000°C," Journal of Solid State Chemistry, 1985, vol. 60, pp. 382-384.
Kimizuka, N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System," Journal of Solid State Chemistry, Apr. 1, 1995, vol. 116, No. 1, pp. 170-178.
Kitzerow, H et al., "Observation of Blue Phases in Chiral Networks," Liquid Crystals, 1993, vol. 14, No. 3, pp. 911-916.
Kurokawa, Y et al., "UHF RFCPUS on Flexible and Glass Substrates for Secure RFID Systems," Journal of Solid-State Circuits , 2008, vol. 43, No. 1, pp. 292-299.
Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.
Lee, H et al., "Current Status of, Challenges to, and Perspective View of Am-Oled," IDW '06 : Proceedings of the 13th International Display Workshops, Dec. 7, 2006, pp. 663-666.
Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.
Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.
Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "SUFTLA Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," IDW '08 : Proceedings of the 6th International Display Workshops, Dec. 3, 2008, pp. 581-584.
Nakamura, "Synthesis of Homologous Compound with New Long-Period Structure," Nirim Newsletter, Mar. 1995, vol. 150, pp. 1-4 with English translation.
Nakamura, M et al., "The phase relations in the In2O3—Ga2ZnO4—ZnO system at 1350° C," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.
Nowatari, H et al., "60.2: Intermediate Connector With Suppressed Voltage Loss for White Tandem OLEDS," SID Digest '09 : SID International Symposium Digest of Technical Papers, May 31, 2009, vol. 40, pp. 899-902.
Oba, F et al., "Defect energetics in ZnO: A hybrid Hartree-Fock density functional study," Phys. Rev. B (Physical Review. B), 2008, vol. 77, pp. 245202-1-245202-6.
Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.
Taiwanese Office Action (Application No. 100126596) Dated Sep. 19, 2014.

* cited by examiner

LIQUID CRYSTAL DISPLAY DEVICE AND DRIVING METHOD OF THE SAME

CROSS-REFERENCE TO RELATED APPLICATIONS

This application is a continuation of U.S. application Ser. No. 13/193,981, filed Jul. 29, 2011, now allowed, which claims the benefit of a foreign priority application filed in Japan as Serial No. 2010-178132 on Aug. 6, 2010, both of which are incorporated by reference.

BACKGROUND OF THE INVENTION

1. Field of the Invention

The present invention relates to a liquid crystal display device and the driving method of the liquid crystal display.

2. Description of the Related Art

In recent years, techniques for reducing power consumption in liquid crystal display devices have been developed.

As a method for reducing power consumption of a liquid crystal display device, a method by which the frequency of writing of an image signal to a pixel during displaying a still image is reduced to be lower than the frequency of writing of an image signal to a pixel during displaying a moving image is given (e.g., Patent Documents 1 and 2). By this method, the frequency of writing of an image signal for displaying a still image is reduced, and power consumption of a liquid crystal display device is reduced.

In a liquid crystal display device, a protection circuit is often provided for a source line or a gate line in order to prevent electrostatic destruction of a transistor or the like in a pixel due to static electricity, overvoltage caused by malfunction, or the like.

For example, a liquid crystal display device which includes a protection circuit in which a MOS transistor whose source and gate are short-circuited and a MOS transistor whose gate and drain are short-circuited are connected in series between a scan electrode and a conductive line provided in a periphery of a display portion is known (e.g., Patent Document 3).

REFERENCES

[Patent Document 1] Japanese Published Patent Application No. 2005-283775

[Patent Document 2] Japanese Published Patent Application No. 2002-278523

[Patent Document 3] Japanese Published Patent Application No. H7-092448

SUMMARY OF THE INVENTION

When a transistor is degraded by a long time use, leakage current of the transistor in an off state becomes large in some cases because of change in characteristics such as a shift of the threshold voltage.

When a transistor is degraded by light such as backlight or external light, leakage current of the transistor in an off state becomes large in some cases because of change in characteristics such as a shift of the threshold voltage.

In addition, when characteristics, such as the threshold voltage, in transistors included in a plurality of protection circuits vary, the protection circuits may include a transistor having large leakage current in the off state.

An object of an embodiment of the present invention is to stably display an image in a liquid crystal display device in which moving image display and still image display are switched, even in the case where change in characteristics such as a shift of threshold voltage of a transistor of a protection circuit is caused.

An object of an embodiment of the present invention is to reduce unevenness of an image in a liquid crystal display device in which moving image display and still image display are switched, even in the case where characteristics such as a shift of threshold voltage of transistors of a plurality of protection circuits vary.

According to an embodiment of the present invention, a liquid crystal display device, in which display is performed by switching a still image display mode and a moving image display mode, includes a pixel including a transistor and a liquid crystal element, and a protection circuit electrically connected to one of a source and a drain of the transistor through a data line. The protection circuit includes a first terminal supplied with a first power supply potential and a second terminal supplied with a second power supply potential which is higher than the first power supply. In the moving image display mode, an image signal is input from the data line to the liquid crystal element through the transistor, and the first power supply potential is set at a first potential. In the still image display mode, the image signal stops being input from the data line to the liquid crystal element, and the first power supply potential is set at a second potential higher than the first potential. The second potential is equal to or close to (i.e., substantially the same as) the minimum value of the image signal.

The transistor may include an oxide semiconductor layer.

According to an embodiment of the present invention, a liquid crystal display device, in which display is performed by switching a still image display mode and a moving image display mode, includes a pixel including a first transistor and a liquid crystal element, and a second transistor which is diode-connected. One of a source and a drain of the second transistor is supplied with a power supply potential. The other of the source and the drain of the second transistor is electrically connected to one of a source and a drain of the first transistor through a data line. In the moving image display mode, an image signal is input from the data line to the liquid crystal element through the first transistor, and the power supply potential is set at a first potential. In the still image display mode, an image signal stops being input from the data line to the liquid crystal element, and the power supply potential is set at a second potential higher than the first potential. The second potential is the same as or close to the minimum value of the potential of the image signal.

The first transistor may include an oxide semiconductor layer.

The still image display mode and the moving image display mode may be switched by detecting a difference of the image signal between consecutive frame periods.

According to an embodiment of the present invention, in a liquid crystal display device in which moving image display and still image display are switched, image display can be performed stably even in the case where change in characteristics such as a shift of threshold voltage of a transistor of a protection circuit is caused.

According to an embodiment of the present invention, in a liquid crystal display device in which moving image display and the still image display are switched, unevenness of an image can be reduced even in the case where characteristics such as a shift of threshold voltage of transistors of a plurality of protection circuits vary.

DETAILED DESCRIPTION OF THE INVENTION

Figure 1:
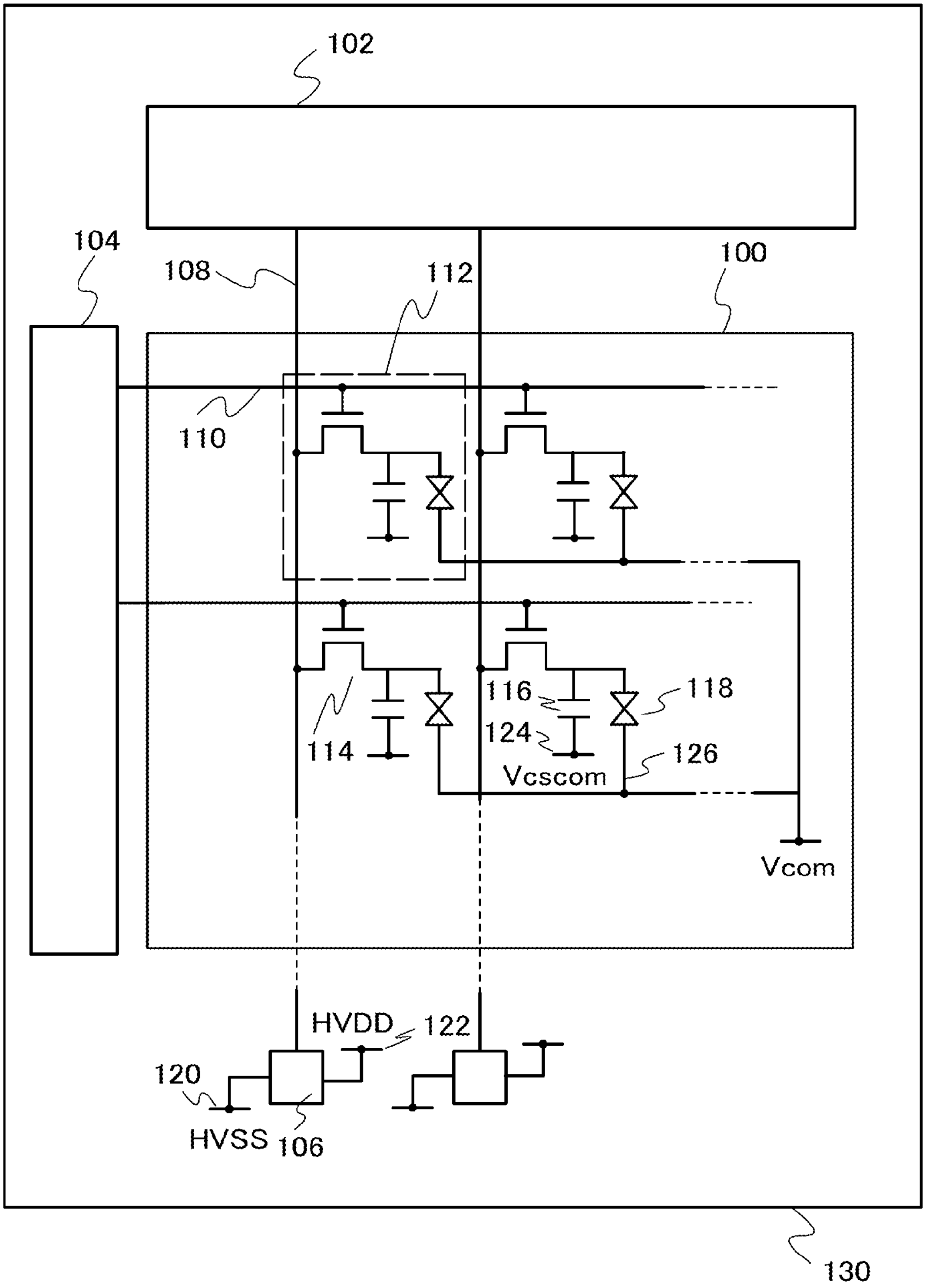
FIG. 1 illustrates an example of a display panel of a liquid crystal display device.

Examples of embodiments of the present invention will be described below with reference to the drawings. Note that the present invention is not limited to the following description. Note that the present invention is not limited to the following description because it will be easily understood by those skilled in the art that various changes and modifications can be made without departing from the spirit and scope of the present invention. Therefore, the present invention should not be construed as being limited to the following description of the embodiments. In referring to the drawings, in some cases, the same reference numerals are used in common for the same portions in different drawings. Further, in some cases, the same hatching patterns are applied to similar parts, and the similar parts are not necessarily designated by reference numerals in different drawings.

Note that the contents in different embodiments can be combined with one another as appropriate. In addition, the contents of the embodiments can be replaced with each other as appropriate.

Further, in this specification, the term "k (k is a natural number)" is used in order to avoid confusion among components, and the terms do not limit the number of components.

Note that a difference between potentials at two points (also referred to as a potential difference) is generally referred to as voltage. However, in an electric circuit, a difference between the potential at one point and the potential serving as a reference (also referred to as a reference potential) is used in some cases. Volt (V) is used as the units either of voltage and a potential. Thus, in this specification, a potential difference between a potential at one point and the reference potential is sometimes used as a voltage at the point unless otherwise specified.

Note that in the liquid crystal display device, the transistor is a field-effect transistor having at least a source, a drain, and a gate unless otherwise specified.

A source refers to part of or the whole of a source electrode, or part of or the whole of a source wiring. A conductive layer having a function of both a source electrode and a source wiring is referred to as a source in some cases without distinction between a source electrode and a source wiring. A drain refers to part of or the whole of a drain electrode, or part of or the whole of a drain wiring. A conductive layer having a function of both a drain electrode and a drain wiring is referred to as a drain in some cases without distinction between a drain electrode and a drain wiring. A gate refers to part or the whole of a gate electrode, or part or the whole of a gate wiring. In some cases, the gate electrode is not distinguished from the gate wiring and a conductive layer having the functions of both the gate electrode and the gate wiring is referred to as a gate.

The source and drain of the transistor are interchanged in some cases depending on the structure, operation condition, or the like of the transistor.

Note that in this embodiment, an "on" state of a transistor means that a source and a drain thereof are electrically connected, while an "off" state of a transistor means that a source and a drain thereof are not electrically connected.

In this specification, off-state current of an n-channel transistor is referred to as current which flows between a source and a drain of the transistor when the potential of the drain is higher than that of the source and a gate and gate-source voltage (Vgs) is lower than and equal to 0 V. In this specification, off-state current of a p-channel transistor is referred to as current which flows between a source and a drain of the transistor when the potential of the drain is lower than that of the source and the gate of the transistor and gate-source voltage (Vgs) is higher than and equal to 0 V.

Note that in this specification, the phrase "A and B are connected to each other" indicates the case where A and B are directly connected to each other in addition to the case where A and B are electrically connected to each other. Specifically, the description that "A and B are connected to each other" includes cases where A and B are considered to have substantially the same potential in light of circuit operation, e.g., a case where A and B are connected through a switching element such as a transistor and A and B have the potentials substantially the same potential as each other when the switching element is on, a case where A and B are connected through a resistor and a potential difference between both ends of the resistor does not affect operation of a circuit including A and B, and the like.

Embodiment 1

In this embodiment, a display device in which moving image display and still image display are switched is described.

As an example of a display device of this embodiment, a structure of a liquid crystal display device and operation thereof are described below.

<Structure of Display Panel>

Figure 2:
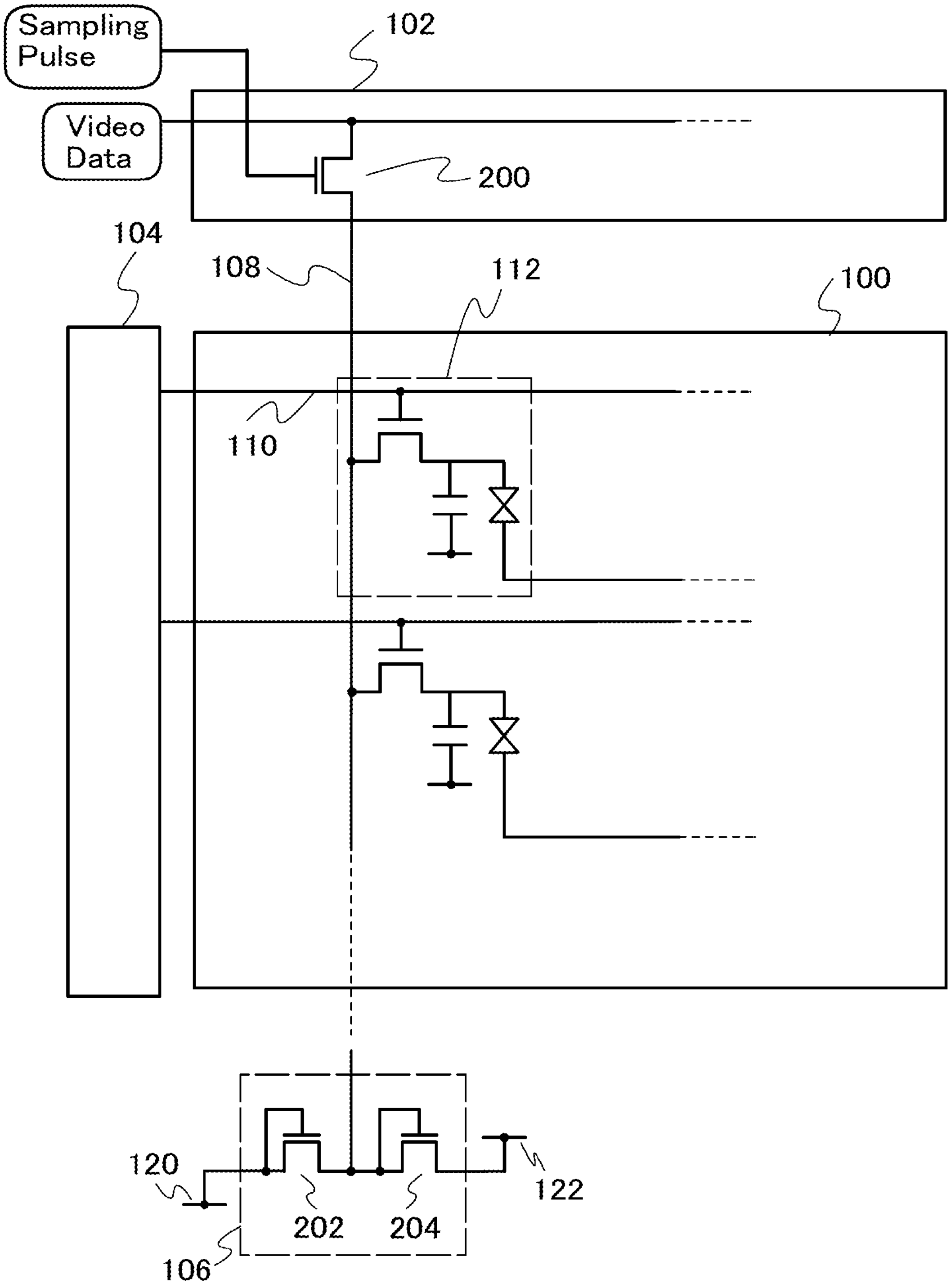
FIG. 2 illustrates an example of a display panel of a liquid crystal display device.

FIG. 1 and FIG. 2 illustrate an example of a display panel of a liquid crystal display device in this embodiment.

In FIG. 1, a display panel 130 includes a pixel portion 100, a data driver 102, a gate driver 104, and a plurality of protection circuits 106. The data driver 102 inputs a signal to a data line 108. The gate driver 104 inputs a signal to a gate line 110.

The pixel portion 100 includes a plurality of pixels 112 arranged in matrix. The pixel 112 includes a transistor 114 connected to the gate line 110 and the data line 108, a capacitor 116, and a liquid crystal element 118 functioning as a display element. Note that although the liquid crystal element 118 is used as a display element in this embodiment, a light-emitting element or the like can be used.

One of a source and a drain of the transistor 114 is connected to the data line 108. An image signal (Video Data) is input from the data driver 102 through the data line 108.

As the image signal (Video Data), a positive signal and a negative signal are alternately input to the one of the source and the drain of the transistor 114. Here, the positive signal is referred to a signal whose potential is higher than a common potential (Vcom) which is a reference; the negative signal is referred to a signal whose potential is lower than the common potential (Vcom).

Note that the common potential (Vcom) is any potential which is a reference with respect to the potential of the image signal (Video Data), and may be set at GND, or 0 V, for example.

A gate of the transistor 114 is connected to the gate line 110, to which, as a power supply potential, a high power supply potential (VDD) and a low power supply potential (VSS) are input from the gate driver 104 through the gate line 110. Here, the high power supply potential (VDD) is higher than the maximum value of the image signal (Video Data); and the low power supply potential (VSS) is lower than the minimum value of the image signal (Video Data).

Note that when the high power supply potential (VDD) is supplied as the power supply potential, the transistor 114 is turned on, so that the image signal (Video Data) is input to the liquid crystal element 118 and the capacitor 116 through the transistor 114. When the low power supply potential (VSS) is supplied as the power supply potential, the transistor 114 is turned off, so that the image signal (Video Data) stops being input to the liquid crystal element 118 and the capacitor 116.

Here, as the transistor 114, a transistor including a semiconductor layer whose carrier number is extremely small is preferably used. As a transistor including a semiconductor layer whose carrier number is extremely small, a transistor including an oxide semiconductor layer can be used, for example.

An oxide semiconductor layer included in the transistor is preferably a highly-purified oxide semiconductor layer by sufficient removal of impurities such as hydrogen or water and sufficient supply of oxygen. The hydrogen concentration of the oxide semiconductor layer is $5\times10^{19}$ atoms/cm$^3$ or less, preferably $5\times10^{18}$ atoms/cm$^3$ or less, more preferably $5\times10^{17}$ atoms/cm$^3$ or less. Note that the above hydrogen concentration of the oxide semiconductor layer is measured by secondary ion mass spectrometry (SIMS).

In the oxide semiconductor layer which is sufficiently reduced in hydrogen concentration and in which defect levels in the energy gap due to oxygen vacancy are decreased by supplying a sufficient amount of oxygen, the carrier concentration is lower than $1\times10^{12}$/cm$^3$, preferably lower than $1\times10^{11}$/cm$^3$, further preferably lower than $1.45\times10^{10}$/cm$^3$. For example, the off-state current (here, current per micrometer (μm) of channel width) at room temperature (25° C.) is lower than or equal to 100 zA (1 zA (zeptoampere) is $1\times10^{-21}$ A), preferably lower than or equal to 10 zA. In this manner, a transistor with good electrical characteristics can be obtained by using an i-type (intrinsic) oxide semiconductor or a substantially i-type oxide semiconductor.

In the case of forming a transistor including an oxide semiconductor containing an alkaline metal or an alkaline earth metal, the off-state current is increased. Thus, in the oxide semiconductor layer, the concentrations of an alkaline metal or an alkaline earth metal is preferably equal to or lower than $2\times10^{16}$ atoms/cm$^3$, more preferably equal to or lower than $1\times10^{15}$ atoms/cm$^3$. An alkaline metal or an alkaline earth metal which are contained in the oxide semiconductor layer are reduced as much as possible as described above, whereby a transistor with good electrical characteristics can be obtained.

Variation in a display state of the pixel 112 which is caused by the off-state current of the transistor can be suppressed by using such a transistor including the oxide semiconductor layer as the transistor 114, so that a holding period of the pixel 112 per one writing operation of the image signal (Video Data) can be longer. Accordingly, the interval between writing operations of the image signal (Video Data) can be longer. For example, the interval between the writing operations of the image signal (Video Data) can be 10 seconds or longer, 30 seconds or longer, or 1 minute or longer.

The liquid crystal element 118 includes a pixel electrode, a common electrode 126 (also referred to as a counter electrode), and a liquid crystal layer provided between the pixel electrode and the common electrode 126. The pixel electrode of the liquid crystal element 118 is connected to the other of the source and the drain the transistor 114, to which the image signal (Video Data) is input through the transistor 114. The common potential (Vcom) is supplied to the common electrode 126 of the liquid crystal element 118.

The liquid crystal layer includes a plurality of liquid crystal molecules. The orientation state of liquid crystal molecules is mainly determined by voltage applied between the pixel electrode and the counter electrode, which varies the light transmittance of liquid crystal.

As the liquid crystal, for example, an electrically controlled birefringence liquid crystal (also referred to as an ECB liquid crystal), a liquid crystal to which dichroic pigment is added (also referred to as a GH liquid crystal), a polymer-dispersed liquid crystal, a discotic liquid crystal, or the like can be used. Note that as the liquid crystal, a liquid crystal exhibiting a blue phase may be used. The liquid crystal layer contains, for example, a liquid crystal composition including a liquid crystal exhibiting a blue phase and a chiral agent. The liquid crystal composition which includes a liquid crystal exhibiting a blue phase and a chiral agent has a short response time of 1 msec or less and is optically isotropic; thus, alignment treatment is not necessary and viewing angle dependence is small. Thus, the operation speed of a liquid crystal display device can be increased with the liquid crystal layer exhibiting a blue phase.

As a display mode of the liquid crystal display device, a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, a FFS (fringe field switching) mode, or the like may be used.

A liquid crystal display device performs image display by switching a plurality of time-divided images at high speed in a plurality of frame periods.

Here, in consecutive frame periods, for example, the n-th frame period and (n+1)th frame period, there are a case where a displayed image is changed and a case where a displayed image is not changed. In this specification, display in the case where the displayed image is changed is referred to as the moving image display, and display in the case where the displayed image is not changed is referred to as the still image display.

A driving method in which the level (polarity) of the voltages applied between the pixel electrode and the counter electrode of a liquid crystal element is inverted per frame period (the driving method also referred to as inversion driving) may be used for a display method of the liquid crystal display device. By using the inversion driving, an image burn-in can be prevented. Note that one frame period corresponds to a period for displaying an image for one screen.

Note that an image is an image formed using the pixel 112 of the pixel portion 100.

A first terminal of the capacitor 116 is connected to the other of the source and the drain of the transistor 114, to which the image signal (Video Data) is input through the transistor 114. A second terminal of the capacitor 116 is connected to a capacitor line 124, to which a common capacitor potential (Vcscom) is supplied from the capacitor line 124. Note that the structure may be used in which a switching element is additionally provided and the common capacitor potential (Vcscom) is supplied to the second terminal of the capacitor 116 by turning on the switching element.

The capacitor 116 has a function as a storage capacitor. The capacitor 116 includes a first electrode which functions as part of or the whole of the first terminal, a second electrode which functions as part of or the whole of the second terminal, and a dielectric layer in which charge corresponding to voltage applied between the first electrode and the second electrode is accumulated. The capacitance of the capacitor 116 may be set considering off-state current of the transistor 114 or the like.

Further, the structure in which the capacitor 116 is not provided in the pixel 112 may be used. Omission of the capacitor 116 can improve the aperture ratio of the pixel 112.

A first terminal 120 and a second terminal 122 are connected to the protection circuit 106. A low power supply potential (HVSS) is supplied to the first terminal 120. A high power supply potential (HVDD) is supplied to the second terminal 122. The protection circuit 106 is connected to the one of the source and the drain of the transistor 114 in the pixel 112 through the data line 108.

The high power supply potential (HVDD) is higher than the low power supply potential (HVSS). Further, the high power supply potential (HVDD) is higher than the common potential (Vcom). The low power supply potential (HVSS) is lower than the common potential (Vcom). Furthermore, the high power supply potential (HVDD) and the high power supply potential (VDD) may be equal to each other.

The low power supply potential (HVSS) is set at a first potential or a second potential higher than the first potential. The first potential is lower than the minimum value of the image signal (Video Data). Further, the first potential and the low power supply potential (VSS) may be equal to each other. The second potential is set at the minimum value of the image signal (Video Data) or the value close to the minimum value of the image signal (Video Data).

Note that although the protection circuit 106 is provided in the display panel 130 in FIG. 1, the structure of the protection circuit of this embodiment is not limited thereto. A structure in which a protection circuit is provided outside the display panel 130 and the protection circuit and the pixel portion 100 are connected through a wiring may be used.

Next, a structure of a circuit for one data line 108 in the display panel 130 of the liquid crystal display device in FIG. 1 is described with reference to FIG. 2.

The data driver 102 includes a plurality of transistors 200 functioning as sampling switches. The plurality of transistors 200 are arranged in parallel to form a sampling circuit.

One of a source and a drain of the transistor 200 is connected to the data line 108. The image signal (Video Data) is input to the other of the source and the drain of the transistor 200. A sampling pulse is input to a gate of the transistor 200.

In accordance with a timing of inputting a sampling pulse to the gate of the transistor 200 among the plurality of transistors 200 included in a sampling circuit, the image signal (Video Data) is input to the data line 108 connected to the transistor. Specifically, when a sampling pulse is input to the gate of the transistor 200, the transistor 200 is turned on and the image signal (Video Data) is input to the data line 108 through the transistor 200.

The protection circuit 106 includes a plurality of diode-connected transistors connected in series.

As an example of the protection circuit 106, FIG. 2 illustrates a structure in which a diode-connected transistor 202 and a diode-connected transistor 204 are provided and connected in series.

One of a source and a drain of the transistor 202 is connected to the first terminal 120. The other of the source and the drain of the transistor 202 is connected to the data line 108.

One of a source and a drain of the transistor 204 is connected to the data line 108. The other of the source and the drain of the transistor 204 is connected to the second terminal 122.

<Structure of Liquid Crystal Display Device>

Next, an example of a structure of a liquid crystal display device including the display panel 130 is described below.

Figure 3:
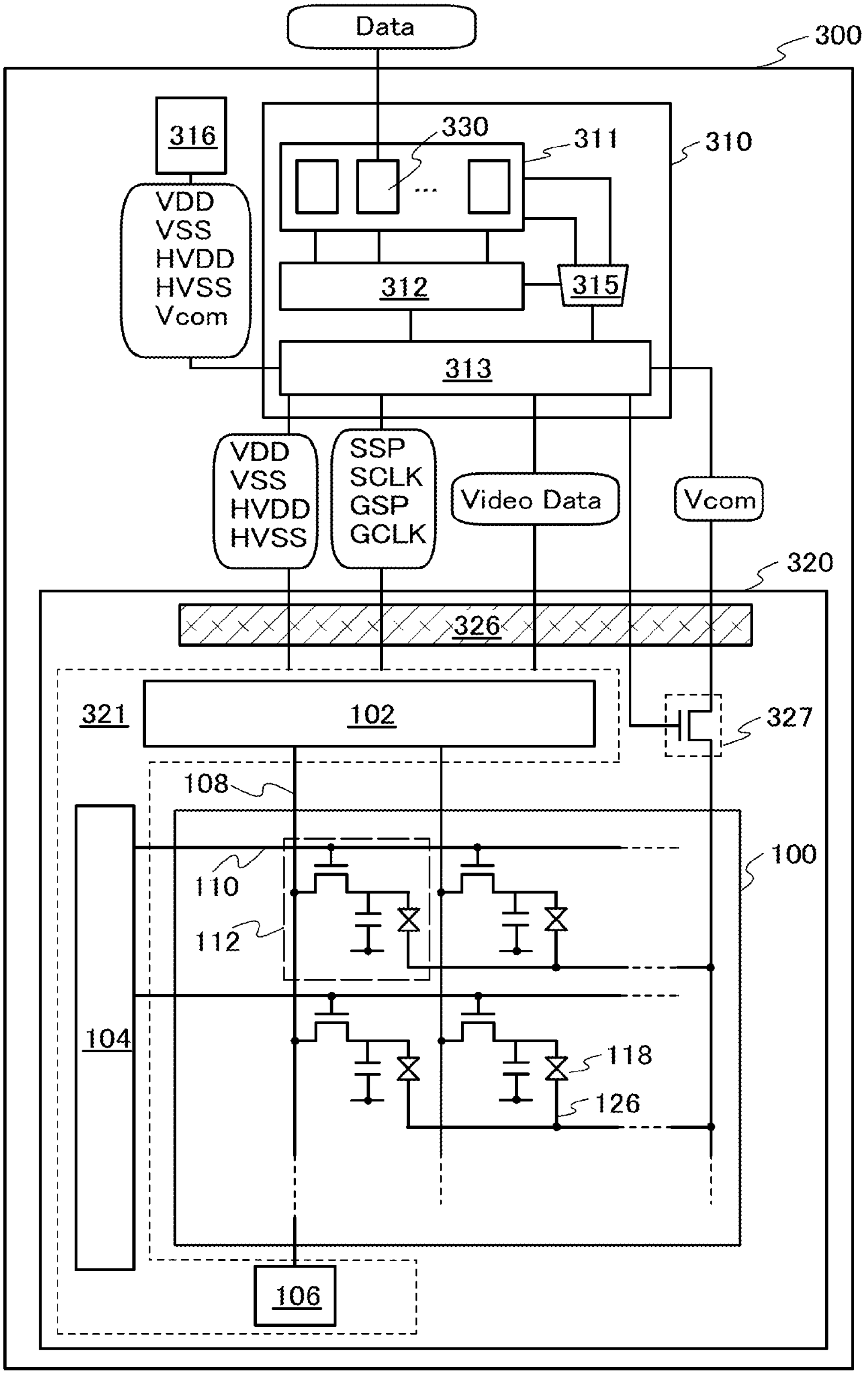
FIG. 3 illustrates an example of a liquid crystal display device.

In FIG. 3, a liquid crystal display device 300 includes an image processing circuit 310, a power source 316, and a display panel 320. The display panel 320 in FIG. 3 corresponds to the display panel 130 in FIG. 1.

The liquid crystal display device 300 is connected to an external device. A signal (Data) including image data is input from the external device.

The signal (Data) including image data is input to the image processing circuit 310. From the inputted signal (Data) including image data, the image processing circuit 310 generates an image signal (Video Data) input to the display panel 320 and control signals (a start pulse (SSP) and a clock signal (SCLK) which are input to the data driver 102, the start pulse (GSP) and a clock signal (GCLK) which are input to the gate driver 104, or the like). Further, the image processing circuit 310 inputs a signal for controlling a transistor 327 included in the display panel 320 to a gate of the transistor 327.

Note that in the case where the signal (Data) including image data is an analog signal, the analog signal may be converted into a digital signal through an A/D converter or the like and then input to the image processing circuit 310. With such a structure, a change of the image signal (Video Data) can be easily detected in a later step.

The power source 316 of the liquid crystal display device 300 is turned on, so that the high power supply potential (VDD), the low power supply potential (VSS), the high power supply potential (HVDD), the low power supply potential (HVSS), the common potential (Vcom), and the like are supplied to the display panel 320 through the image processing circuit 310.

The control signals (the start pulse (SSP), the clock signal (SCLK), the start pulse (GSP), the clock signal (GCLK), and the like) are input from a display control circuit 313 to the display panel 320. The image signal (Video Data) selected in a selection circuit 315 is input from the display control circuit 313 to the display panel 320.

Next, a structure of the image processing circuit 310 and a process of processing a signal or the like in the image processing circuit 310 are described below.

The image processing circuit 310 includes a memory circuit 311, a comparison circuit 312, the display control circuit 313, and the selection circuit 315.

The memory circuit 311 includes a plurality of frame memories 330. By the frame memories 330, the signals (Data) including image data which correspond to a plurality of frame periods are stored. The frame memory 330 may be formed using a memory element such as a dynamic random access memory (DRAM) or a static random access memory (SRAM).

Note that it is acceptable as long as the frame memory 330 has a structure in which the signal (Data) including image data is stored every frame period. The number of the frame memories 330 in the memory circuit 311 is not particularly limited. The image signal (Video Data) generated from the signal (Data) including image data which is stored in the frame memory 330 is selectively read by the comparison circuit 312 and the selection circuit 315. Note that the frame memory 330 in FIG. 3 conceptually shows a memory region corresponding to one frame period.

The comparison circuit 312 selectively reads the image signals (Video Data) of consecutive frame periods, which are stored in the memory circuit 311, compares the signals for each pixel, and detects a difference thereof. Note that the consecutive frame periods are a period which consists of a frame period and the adjacent frame period.

In this embodiment, the comparison circuit 312 detects whether there is a difference of the image signal (Video Data) between consecutive frame periods or not, whereby the operation of the display control circuit 313 and the operation of the selection circuit 315 are determined.

In the case where in consecutive frame periods, a difference is detected in any of pixels by comparison of the image signal (Video Data) performed by the comparison circuit 312 (in the case where there is a difference), the comparison circuit 312 judges that the image signal (Video Data) is not for displaying a still image and the moving image display is performed in the consecutive frame periods in which the difference is detected.

Note that in the case where a difference is detected only in part of pixels in the consecutive frame periods, the image signal (Video Data) may be written to only the pixel(s) in which the difference is detected. In that case, the data driver 102 and the gate driver 104 each include a decoder.

On the other hand, in the case where in consecutive frame periods, a difference is not detected in all of pixels by comparison of the image signal (Video Data) in the comparison circuit 312 (in the case where there is not a difference), the comparison circuit 312 judges that the image signal (Video Data) is for displaying a still image and the still image display is performed in the consecutive frame periods in which a difference is not detected.

In this manner, by detecting whether there is a difference of the image signal (Video Data) between the consecutive frame periods, the comparison circuit 312 judges whether the signal is for displaying a still image or not (whether the signal is a signal for displaying a still image or a signal for displaying a moving image).

Note that in the above description, the case where the difference is detected is judged as the case where there is a difference; however, criterion of judgment of "there is a difference" is not limited thereto. For example, the case where an absolute value of a difference detected by the comparison circuit 312 exceeds a predetermined value may be judged as the case where there is a difference.

In the above description, the comparison circuit 312 in the liquid crystal display device 300 detects a difference of the image signal (Video Data) between consecutive frame periods, so that whether the image signal (Video Data) is a signal for displaying a still image or not is judged; however, this embodiment is not limited to this structure. A signal for judging whether the image signal (Video Data) is a signal for displaying a still image or not may be input to the liquid crystal display device 300 from the outside of the liquid crystal display device 300.

The selection circuit 315 includes semiconductor elements functioning as a plurality of switching elements. As such a semiconductor element, a transistor or a diode can be used.

In the case where the comparison circuit 312 detects a difference of the image signal (Video Data) between the consecutive frame periods, the selection circuit 315 selects the image signal (Video Data) for displaying a moving image from the frame memories 330 in the memory circuit 311, and inputs the signal to the display control circuit 313.

In the case where the comparison circuit 312 does not detect a difference of the image signal (Video Data) between the consecutive frame periods, the selection circuit 315 does not input the image signal (Video Data) from the frame memories 330 included in the memory circuit 311 to the display control circuit 313. With a structure in which the image signal (Video Data) is not input, power consumption of the liquid crystal display device 300 can be reduced.

Note that in a liquid crystal display device in this embodiment, a display mode in which the comparison circuit 312 judges the image signal (Video Data) as a signal for displaying a still image is referred to as a still image display mode. Further, a display mode in which the comparison circuit 312 judges the image signal (Video Data) as a signal for displaying a moving image is referred to as a moving image display mode.

The display control circuit 313 may have a function of selecting the moving image display mode or the still image display mode. For example, the following structure may be used: a user of the liquid crystal display device 300 selects the display mode of the liquid crystal display device 300 manually or by an external device, so that the moving image display mode and the still image display mode are switched.

A circuit (also referred to as a display mode selection circuit) having a function of selecting a display mode may be additionally provided, and the image signal (Video Data) may be input from the selection circuit 315 to the display control circuit 313 in accordance with a signal input from the display mode selection circuit.

For example, the following structure may be used: in the case where a signal for switching the display mode is input from the display mode selection circuit to the selection circuit 315 when the display device is operated in the still image display mode, the selection circuit 315 performs the mode (i.e., the moving image display mode) in which the inputted image signal (Video Data) is input even when the comparison circuit 312 does not detect a difference of the image signal (Video Data) between the consecutive frame periods.

For example, the following structure may be used: in the case where a signal for switching the display mode is input from the display mode selection circuit to the selection circuit 315 when the display device is operated in the moving image display mode, the selection circuit 315 performs the mode (i.e., the still image display mode) in which only the image signal (Video Data) of a selected frame period is input even when the comparison circuit 312 detects a difference of the image signal (Video Data) between the consecutive frame periods. In this case, even when the liquid crystal display device 300 is operated in the moving image display mode, the still image display is performed in the selected frame period.

In the display panel 320 in FIG. 3, the transistor 327 and a terminal portion 326 are illustrated in addition to the pixel portion 100 or the like in FIG. 1.

The common electrode 126 is provided over a substrate opposing the substrate provided with the pixel electrode.

Liquid crystal of the liquid crystal element 118 is controlled by a vertical electric field generated by the pixel electrode and the common electrode 126.

Further, the common potential (Vcom) is supplied to the common electrode 126 through the transistor 327 in accordance with input of a signal from the display control circuit 313.

The gate of the transistor 327 is connected to the display control circuit 313 through the terminal portion 326, and a control signal is input from the display control circuit 313 to the gate of the transistor 327. A first terminal (one of a source and a drain) of the transistor 327 is connected to the display control circuit 313 through the terminal portion 326, and the common potential (Vcom) is supplied from the display control circuit 313 to the first terminal A second terminal (the other of the source and the drain) of the transistor 327 is connected to the common electrode 126.

Note that the transistor 327 may be provided over the same substrate as or a different substrate from at least one of a substrate provided with a driver portion 321 (i.e., the data driver 102, the gate driver 104, the protection circuit 106, and the like) and a substrate providing the pixel portion 100. In addition, in stead of the transistor 327, a semiconductor element (e.g., a diode) functioning as a switching element may be used.

<Method for Driving Liquid Crystal Display Device>

Figure 4:
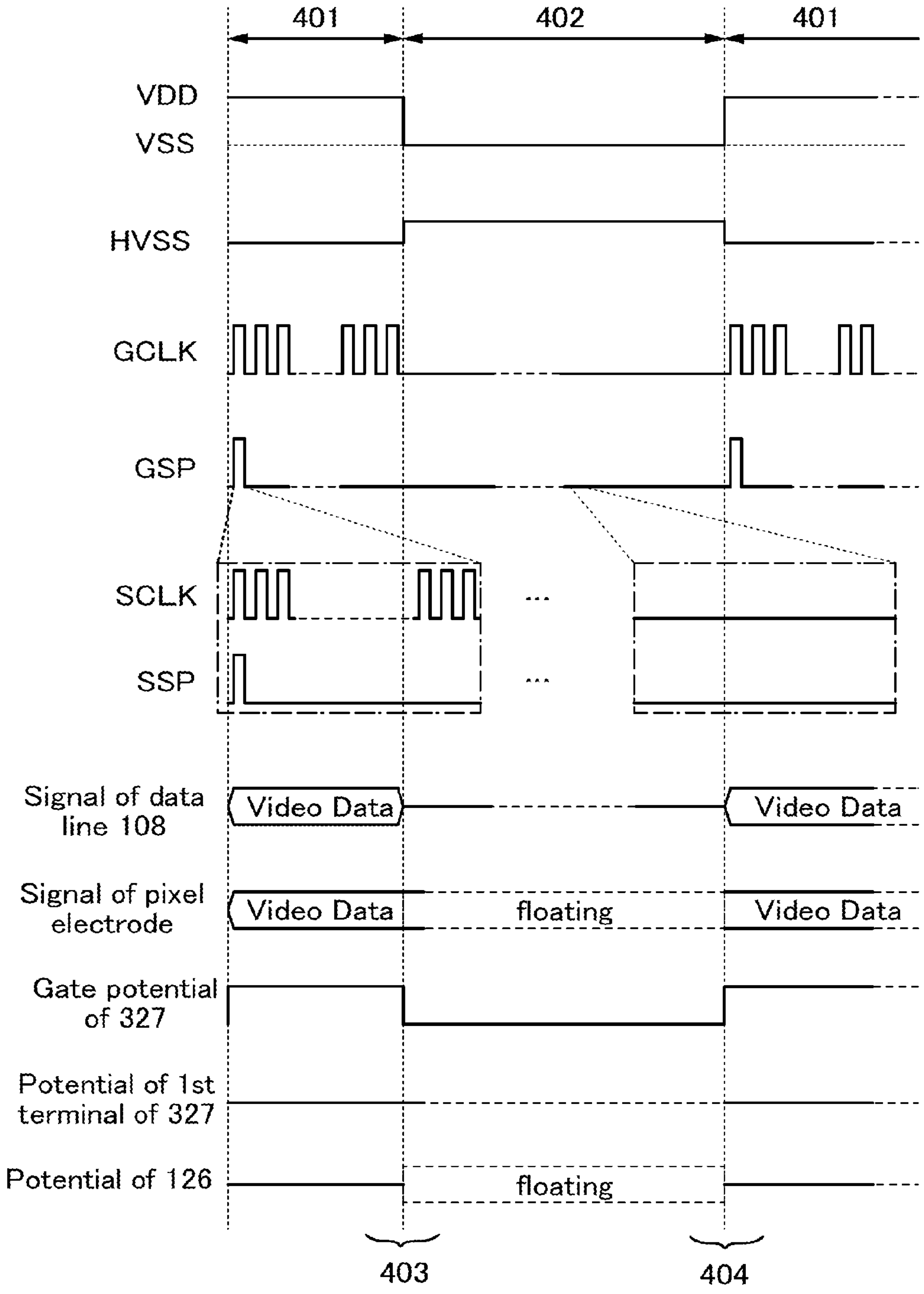
FIG. 4 is a timing diagram for illustrating an example of a method for driving a liquid crystal display device.
Figure 5A:
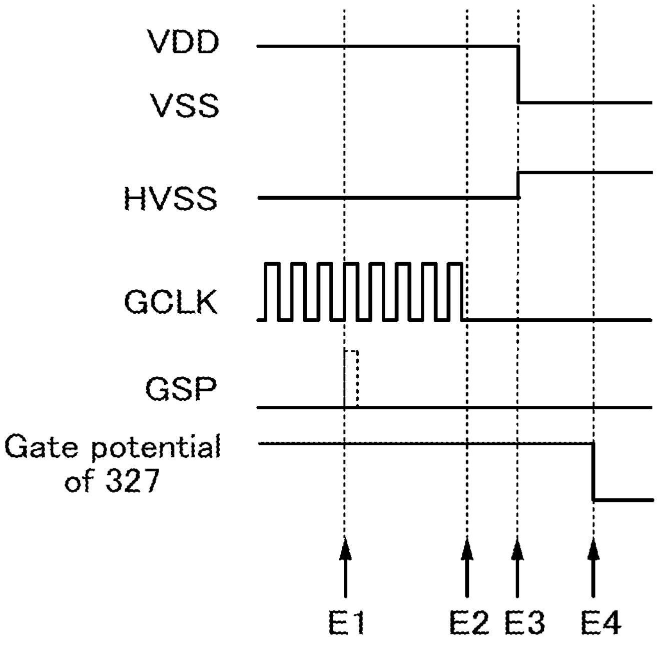
FIGS. 5A and 5B are timing diagrams for illustrating an example of a method for driving a liquid crystal display device.
Figure 5B:
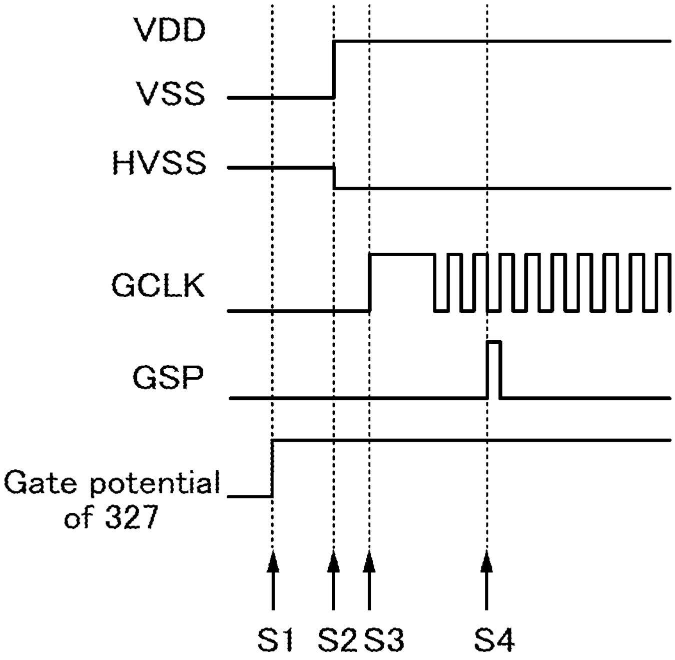

Then, an example of a method for driving a liquid crystal display device in this embodiment is described with reference to timing diagrams illustrated in FIG. 4 and FIGS. 5A and 5B. Note that FIG. 4 and FIGS. 5A and 5B illustrate the waveform of a signal with a simple square wave in order to explain timing of inputting the signal. As a structure of a liquid crystal display device, the structure illustrated in FIG. 3 is used.

First, signals input to the display panel 320 are described with reference to the timing diagram in FIG. 4.

FIG. 4 shows the clock signal (GCLK) and the start pulse (GSP) which are input from the display control circuit 313 to the gate driver 104 and the clock signal (SCLK) and the start pulse (SSP) which are input from the display control circuit 313 to the data driver 102.

Furthermore, FIG. 4 illustrates the power supply potential (the high power supply potential (VDD) and the low power supply potential (VSS)) which are supplied to the gate of the transistor 114, the low power supply potential (HVSS) which is supplied to the first terminal 120 of the protection circuit 106, the image signal (Video Data) input to the data line 108, the image signal (Video Data) input to the pixel electrode, a gate potential and the potential of the first terminal of the transistor 327, and the potential of the common electrode 126.

A period 401 illustrated in FIG. 4 is a period for displaying a moving image.

In the period 401, a clock signal is input at all times as the clock signal (GCLK), and a pulse is input as the start pulse (GSP) in accordance with a vertical synchronization frequency. Further, in the period 401, a clock signal is input at all times as the clock signal (SCLK), and a pulse is input as the start pulse (SSP) in accordance with one gate selection period.

In the period 401, the high power supply potential (VDD) is supplied to the gate line 110 as the power supply potential, and the transistor 114 is turned on. The image signal (Video Data) is input from the data line 108 to the pixel electrode of the liquid crystal element 118 and the first terminal of the capacitor 116 through the transistor 114 in an on state.

In the period 401, a potential at which the transistor 327 is turned on is supplied from the display control circuit 313 to the gate of the transistor 327. Accordingly, the common potential (Vcom) is supplied to the common electrode 126 of the liquid crystal element 118 through the transistor 327 in an on state.

A period 402 illustrated in FIG. 4 corresponds to a period for displaying a still image.

In the period 402, the control signals (the clock signal (SCLK), the start pulse (SSP), the clock signal (GCLK), the start pulse (GSP), and the like) stop being input; therefore, the operation of the data driver 102 and the operation of the gate driver 104 are stopped. Power consumption can be reduced by stopping input of the control signals.

Further, in the period 402, the low power supply potential (VSS) is supplied to the gate line 110 as the power supply potential, and the transistor 114 is turned off. Since the transistor 114 is in an off state, the image signal (Video Data) stops being input from the data line 108 to a pixel to allow the potential of the pixel electrode of the liquid crystal element 118 to exist in a floating state.

Note that although input of the image signal (Video Data) is stopped in the period 402 in FIG. 4, this embodiment is not limited thereto. The image signal (Video Data) may be written at regular intervals in accordance with the length of the period 402 and refresh rate in order to prevent deterioration of a still image.

A potential at which the transistor 327 is turned off is supplied from the display control circuit 313 to the gate of the transistor 327. When the transistor 327 is turned off, the common potential (Vcom) stops being supplied to the common electrode 126, so that the potential of the common electrode 126 of the liquid crystal element 118 is in a floating state. In this manner, the potentials of the both electrodes (i.e., the pixel electrode and the common electrode 126) of the liquid crystal element 118 are transformed to be in a floating state and no potential is additionally supplied, whereby a still image can be displayed.

Next, the operation of the display control circuit 313 in a period (a period 403 in FIG. 4) for switching from the moving image display to the still image display is described with reference to the timing diagram of FIG. 5A.

FIG. 5A illustrates the power supply potential (the high power supply potential (VDD) and the low power supply potential (VSS)), the low power supply potential (HVSS), and the gate potential of the transistor 327, which are supplied from the display control circuit 313. FIG. 5A also illustrates the clock signal (GCLK) and the start pulse (GSP) which are input from the display control circuit 313.

First, the start pulse (GSP) stops being input from the display control circuit 313 (E1 in FIG. 5A).

After input of the start pulse (GSP) stops and the image signal (Video Data) is written to all of the pixels, the clock signal (GCLK) stops being input from the display control circuit 313 (E2 in FIG. 5A).

Then, the power supply potential is changed from the high power supply potential (VDD) to the low power supply potential (VSS). After the high power supply potential (VDD) stops being supplied, the potential of the low power supply potential (HVSS) supplied to the first terminal 120 of the protection circuit 106 is increased from the first potential to the second potential (E3 in FIG. 5A). Here, the second potential has the same value of the minimum value of the image signal (Video Data) or a value close to the minimum value of the image signal (Video Data).

Note that in E3 in FIG. 5A, the timing at which the low power supply potential (VSS) is supplied and the timing at which the low power supply potential (HVSS) is increased are the same; however, this embodiment is not limited thereto. The low power supply potential (HVSS) is increased and becomes the second potential before the potential at which the transistor 327 is turned off is supplied to the gate of the transistor 327.

After that, the gate potential of the transistor 327 is set at the potential at which the transistor 327 is tuned off (E4 in FIG. 5A).

Through the above procedure, input of a signal to the data driver 102 and the gate driver 104 can be stopped.

When overvoltage is generated by malfunction of the driver portion 321 in switching from the moving image display to the still image display, the still image display is adversely influenced. On the other hand, the display control circuit 313 is used as described in this embodiment, so that a still image can be displayed without malfunction of the driver portion 321.

Then, the operation of the display control circuit 313 in a period (a period 404 in FIG. 4) for switching from the still image display to the moving image display is described with reference to the timing diagram of FIG. 5B.

FIG. 5B illustrates the power supply potential (the high power supply potential (VDD) and the low power supply potential (VSS)), the low power supply potential (HVSS), and the gate potential of the transistor 327, which are supplied from the display control circuit 313. FIG. 5A also illustrates the clock signal (GCLK) and the start pulse (GSP) are input from the display control circuit 313.

First, the gate potential of the transistor 327 is set at the potential at which the transistor 327 is turned on (S1 in FIG. 5B).

Then, the power supply potential is changed from the low power supply potential (VSS) to the high power supply potential (VDD). At the same time in which the high power supply potential (VDD) is supplied, the potential of the low power supply potential (HVSS) supplied to the first terminal 120 of the protection circuit 106 is decreased from the second potential to the first potential (S2 in FIG. 5B). Here, the first potential has a value lower than the minimum value of the image signal (Video Data). In addition, the first potential and the low power supply potential (HVSS) may have the same value.

Note that in S2 in FIG. 5B, the timing at which the high power supply potential (VDD) is supplied and the timing at which the low power supply potential (HVSS) is decreased are the same; however, this embodiment is not limited thereto. The low power supply potential (HVSS) is decreased and becomes the first potential before the start pulse (GSP) is input to the display panel 320.

Next, after all of the clock signals (GCLK) input to the display panel 320 is set at an H (high) level, the normal clock signal (GCLK) is input (S3 in FIG. 5B).

Then, the start pulse (GSP) is input to the display panel 320 (S4 in FIG. 5B).

Through the above procedure, input of a signal to the data driver 102 and the gate driver 104 can be resumed.

As described in this embodiment, the potentials of wirings are sequentially restored at the potentials in the moving image display, whereby a moving image can be displayed without malfunction of the driver portion 321.

In this embodiment, after the high power supply potential (VDD) stops being supplied, the low power supply potential (HVSS) supplied to the first terminal 120 of the protection circuit 106 is increased.

Here, after the high power supply potential (VDD) stops being supplied to the display panel 320 (E3 in FIG. 5A), the potential of the data line 108 is considered. Just after the high power supply potential (VDD) stops being supplied, the image signal (Video Data) is held by the liquid crystal element 118 and the capacitor 116.

First, the case where the low power supply potential (HVSS) supplied to the first terminal 120 of the protection circuit 106 is not increased and is maintained to be the first potential is described. Note that the first potential has a value lower than the minimum value of the image signal (Video Data).

Here, the potential of the data line 108 is decreased so as to approach the low power supply potential (HVSS) over time by the leakage current of the transistor 202 in the case where the leakage current of the transistor 202 in an off state, which is included in the protection circuit 106, is large.

Further, by decrease in the potential of the data line 108, charge accumulated in the liquid crystal element 118 and the capacitor 116 easily moves to the data line 108 through the transistor 114 in an off state. If the charge moves to the data line 108, the image signal (Video Data) cannot be held by the liquid crystal element 118 and the capacitor 116.

For example, when a transistor is degraded by a long time use, variation in characteristics such as a shift of the threshold voltage occurs; accordingly the leakage current of a transistor in an off state might be increased. Therefore, in a liquid crystal display device in which the moving image display and the still image display are switched, when the transistor 202 included in the protection circuit 106 is degraded by a long time use, the liquid crystal element 118 cannot hold the image signal (Video Data) in the still image display because of the leakage current of the transistor 202. As a result, an image cannot be stably displayed.

Further, when a transistor is degraded by light such as backlight or external light, variation in characteristics such as a shift of the threshold voltage occurs; accordingly the leakage current of a transistor in an off state might be increased. Therefore, in a liquid crystal display device in which the moving image display and the still image display are switched, when the transistor 202 included in the protection circuit 106 is degraded by light such as backlight or external light, the liquid crystal element 118 cannot hold the image signal (Video Data) in the still image display because of the leakage current of the transistor 202. As a result, an image cannot be stably displayed.

Furthermore, when characteristics, such as threshold voltage, of the transistors 202 included in the plurality of protection circuits 106 vary, part of the transistors 202 would have extremely large leakage current in the off state. Therefore, in a liquid crystal display device in which the moving image display, the leakage current of the part of the transistors 202 does not allow the corresponding liquid crystal elements 118 to hold the image signal (Video Data) in the still image display. As a result, unevenness of an image is caused.

On the other hand, in this embodiment, after the high power supply potential (VDD) stops being supplied, the low power supply potential (HVSS) supplied to the first terminal 120 of the protection circuit 106 is increased and is set at the same as or close to the value of the second potential, that is, the minimum value of the image signal (Video Data).

Accordingly, a difference between the low power supply potential (HVSS) and the potential of the data line 108 can be smaller. Thus, reduction in the potential of the data line 108 can be suppressed.

Therefore, even when the transistor 202 included in the protection circuit 106 is degraded, the image signal (Video Data) can be stably held by the liquid crystal element 118 by suppression of reduction in the potential of the data line 108. Thus, an image can be displayed stably.

Further, even when the characteristics of the transistors 202, such as the threshold voltage, included in the plurality of protection circuits 106 are varied, the image signal (Video Data) can be stably held by the liquid crystal element 118 corresponding to the data line 108 by suppression of reduction in the potential of the data line 108. Accordingly, unevenness of an image can be reduced.

Note that it is preferable that a transistor including an oxide semiconductor layer be used as the transistor 114 included in the pixel portion in addition to a method in which the low power supply potential (HVSS) supplied to the first terminal 120 of the protection circuit 106 is increased after the high power supply potential (VDD) stops being supplied. As a result, the leakage current of the transistor 114 can be reduced, whereby the liquid crystal element 118 can hold the image signal (Video Data) more certainly.

Figure 6:
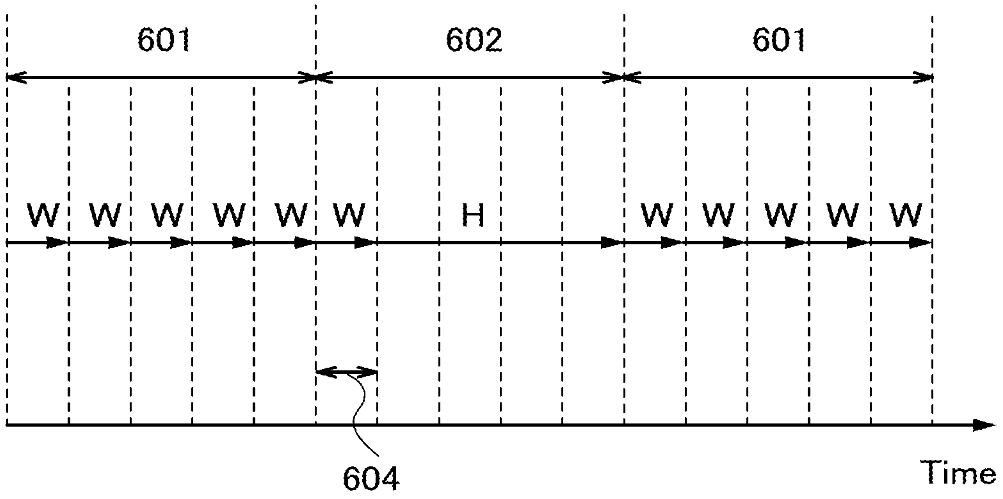
FIG. 6 illustrates the frequency of writing of an image signal.

FIG. 6 schematically illustrates the frequency of writing of the image signal (Video Data) for each frame period in a period 601 in which a moving image is displayed and a period 602 in which a still image is displayed. In FIG. 6, "W" denotes a period for writing the image signal (Video Data) and "H" denotes a period for holding the image signal (Video Data).

In the liquid crystal display device 300 in this embodiment, the image signal (Video Data) of the still image displayed in the period 602 is written in a period 604. The image signal (Video Data) written in the period 604 is held in a period other than the period 604 in the period 602.

In this manner, in the period for displaying a still image with the liquid crystal display device 300 in this embodiment, the frequency of writing of the image signal (Video Data) can be reduced by extending the display time per one writing of the image signal (Video Data). Therefore, in the still image display, power consumption of displaying an image or the like can be reduced.

Further, when a still image is displayed by rewriting the same image signal (Video Data) plural times, eyes of a user (a human) might be fatigued when switching of images is perceptible. In the period for displaying a still image with the liquid crystal display device 300 in this embodiment, the frequency of writing of the image signal (Video Data) can be reduced by extending the display time per one writing of the image signal (Video Data). Therefore, in the still image display, eye fatigue of a user can be less severe.

As described above, the low power supply potential (HVSS) supplied to the first terminal 120 of the protection circuit 106 is increased after the high power supply potential (VDD) stops being supplied, whereby the image signal (Video Data) of the liquid crystal element 118 can be stably held. Accordingly, stable image display can be performed.

Further, the low power supply potential (HVSS) supplied to the first terminal 120 of the protection circuit 106 is increased after the high power supply potential (VDD) stops being supplied, whereby the image signal (Video Data) of the liquid crystal element 118 can be stably held. Accordingly, unevenness of an image can be reduced.

Embodiment 2

In this embodiment, a structure example of a transistor included in the liquid crystal display device which is described in Embodiment 1 will be explained.

As a structure example of a transistor, a structure of a transistor including an oxide semiconductor layer as a semiconductor layer is described with reference to FIGS. 7A to 7D and FIGS. 12A and 12B. FIGS. 7A to 7D and FIGS. 12A and 12B are cross-sectional schematic views.

Figure 7A:
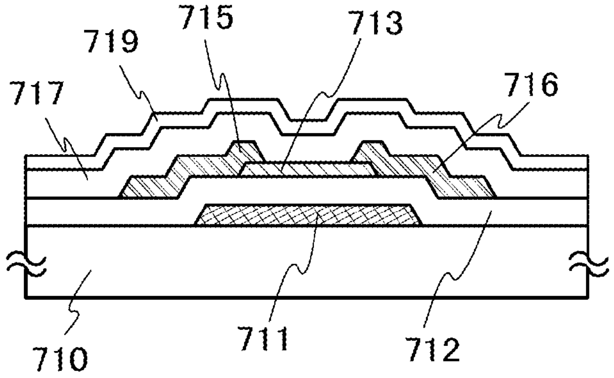
FIGS. 7A to 7D each illustrate an example of a structure of a transistor.

A transistor in FIG. 7A is one of a bottom-gate transistors and also referred to as an inverted staggered transistor.

The transistor in FIG. 7A includes a conductive layer 711 which is provided over a substrate 710, an insulating layer 712 which is provided over the conductive layer 711, an oxide semiconductor layer 713 which is provided over the conductive layer 711 with the insulating layer 712 provided therebetween, and a conductive layer 715 and a conductive layer 716 which are each provided over part of the oxide semiconductor layer 713.

Further, FIG. 7A illustrates an oxide insulating layer 717 which is in contact with the other part of the oxide semiconductor layer 713 (a portion in which the conductive layer 715 and the conductive layer 716 are not provided) of the transistor, and a protective insulating layer 719 which is provided over the oxide insulating layer 717.

Figure 7B:
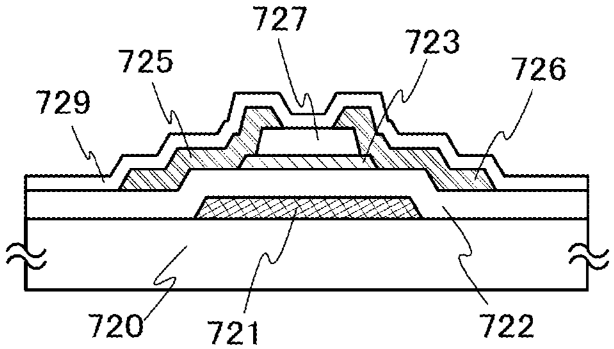

A transistor in FIG. 7B is a channel protective (also referred to as a channel stop) transistor which is one of a bottom-gate transistors, and is also referred to as an inverted staggered transistor.

The transistor in FIG. 7B includes a conductive layer 721 which is provided over a substrate 720, an insulating layer 722 which is provided over the conductive layer 721, an oxide semiconductor layer 723 which is provided over the conductive layer 721 with the insulating layer 722 provided therebetween, an insulating layer 727 which is provided over the conductive layer 721 with the insulating layer 722 and the oxide semiconductor layer 723 provided therebetween, and a conductive layer 725 and a conductive layer 726 which are each provided over part of the oxide semiconductor layer 723 and part of the insulating layer 727.

Here, when part of or whole of the oxide semiconductor layer 723 overlaps the conductive layer 721, incidence of light to the oxide semiconductor layer 723 can be suppressed.

Further, FIG. 7B illustrates a protective insulating layer 729 which is provided over the transistor.

Figure 7C:
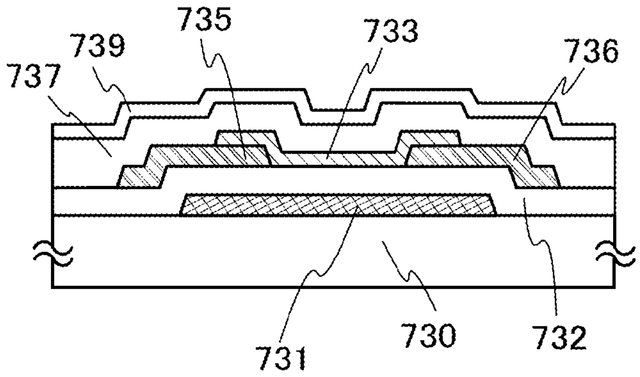

A transistor in FIG. 7C is one of a bottom-gate transistors.

The transistor in FIG. 7C includes a conductive layer 731 which is provided over a substrate 730; an insulating layer 732 which is provided over the conductive layer 731; a conductive layer 735 and a conductive layer 736 which are each provided over part of the insulating layer 732; and an oxide semiconductor layer 733 which is provided over the conductive layer 731 with the insulating layer 732, the conductive layer 735, and the conductive layer 736 provided therebetween.

Here, when part of or whole of the oxide semiconductor layer 733 overlaps the conductive layer 731, incidence of light to the oxide semiconductor layer 733 can be suppressed.

Further, FIG. 7C illustrates an oxide insulating layer 737 which is in contact with a top surface and a side surface of the oxide semiconductor layer 733, and a protective insulating layer 739 which is provided over the oxide insulating layer 737.

Figure 7D:
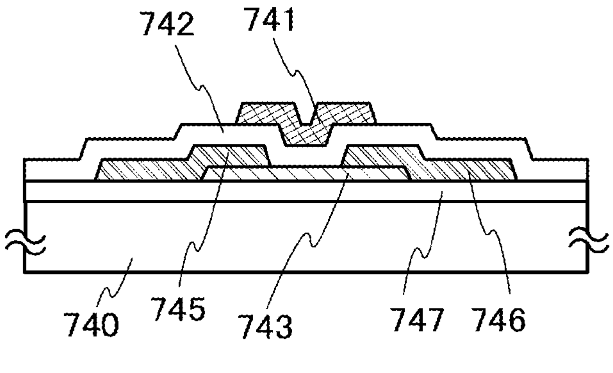

A transistor in FIG. 7D is one of top-gate transistors.

The transistor in FIG. 7D includes an oxide semiconductor layer 743 which is provided over a substrate 740 with an insulating layer 747 provided therebetween; a conductive layer 745 and a conductive layer 746 which are each provided over part of the oxide semiconductor layer 743; an insulating layer 742 which is provided over the oxide semiconductor layer 743, the conductive layer 745, and the conductive layer 746; and a conductive layer 741 which is provided over the oxide semiconductor layer 743 with the insulating layer 742 provided therebetween.

For each of the substrate 710, the substrate 720, the substrate 730, and the substrate 740, a glass substrate (e.g., a barium borosilicate glass substrate and an aluminoborosilicate glass substrate), a substrate formed of an insulator (e.g., a ceramic substrate, a quartz substrate, and a sapphire substrate), a crystallized glass substrate, a plastic substrate, a semiconductor substrate (e.g., a silicon substrate), or the like can be used.

In the transistor in FIG. 7D, the insulating layer 747 serves as a base layer preventing diffusion of an impurity element from the substrate 740. As an example, a single layer or a stacked layer of a silicon nitride layer, a silicon oxide layer, a silicon nitride oxide layer, a silicon oxynitride layer, an aluminum oxide layer, or an aluminum oxynitride layer can be used for the insulating layer 747. Alternatively, a stacked layer of the above layer and a layer of a material having a light-blocking property is used for the insulating layer 747. Further alternatively, a layer of a material having a light-blocking property is used for the insulating layer 747. Note that when a layer of a material having a light-blocking property is used as the insulating layer 747, incidence of light to the oxide semiconductor layer 743 can be suppressed.

Note that as in the transistor in FIG. 7D, in the transistors in FIGS. 7A to 7C, the insulating layer 747 can be formed between the substrate 710 and the conductive layer 711, between the substrate 720 and the conductive layer 721, and between the substrate 730 and the conductive layer 731.

The conductive layers (the conductive layer 711, the conductive layer 721, the conductive layer 731, and the conductive layer 741) have a function as a gate of the transistor. For these conductive layers, as an example, a layer including a metal such as molybdenum, titanium, chromium, tantalum, tungsten, aluminum, copper, neodymium, or scandium, or an alloy which contains the metal as a main component is used.

The insulating layers (the insulating layer 712, the insulating layer 722, the insulating layer 732, and the insulating layer 742) have a function as a gate insulating layer of the transistor.

A silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a hafnium oxide layer, an aluminum gallium oxide layer, or the like can be used for the insulating layers (the insulating layer 712, the insulating layer 722, the insulating layer 732, and the insulating layer 742).

An insulating layer containing oxygen is preferably used for the insulating layers (the insulating layer 712, the insulating layer 722, the insulating layer 732, and the insulating layer 742) which have a function as a gate insulating layer in contact with the oxide semiconductor layers (the oxide semiconductor layer 713, the oxide semiconductor layer 723, the oxide semiconductor layer 733, and the oxide semiconductor layer 743). It is more preferable that the insulating layer containing oxygen has a region (also referred to as an oxygen excessive region) which contains oxygen larger in proportion than the stoichiometric proportion.

When the insulating layer having a function as a gate insulating layer includes the oxygen excessive region, oxygen can be prevented from being transferred from the oxide semiconductor layer to the insulating layer having a function as a gate insulating layer. Further, oxygen can be supplied to the oxide semiconductor layer from the insulating layer having a function as a gate insulating layer. Thus, the oxide semiconductor layer in contact with the insulating layer having a function as a gate insulating layer can be a layer containing a sufficient amount of oxygen.

The insulating layers (the insulating layer 712, the insulating layer 722, the insulating layer 732, and the insulating layer 742) having a function as a gate insulating layer is preferably formed by using a method with which impurities such as hydrogen and water do not enter the insulating layers. The reason is as follows. When the insulating layer having a function as a gate insulating layer includes impurities such as hydrogen and water, entry of impurities such as hydrogen and water to the oxide semiconductor layers (the oxide semiconductor layer 713, the oxide semiconductor layer 723, the oxide semiconductor layer 733, and the oxide semiconductor layer 743), extraction of oxygen in the oxide semiconductor layers due to impurities such as hydrogen and water, or the like occurs. Thus, the oxide semiconductor layer might be reduced in resistance (n-type conductivity) and a parasitic channel might be formed. For example, the insulating layer having a function as a gate insulating layer is formed by sputtering. As a sputtering gas, a high-purity gas from which impurities such as hydrogen and water are removed is preferably used.

Further, treatment for supplying oxygen is preferably performed on the insulating layer having a function as a gate insulating layer. As the treatment for supplying oxygen, heat treatment in an oxygen atmosphere, oxygen doping treatment, and the like can be given. Alternatively, oxygen may be added by performing irradiation with oxygen ions accelerated by an electric field. Note that in this specification, "oxygen doping treatment" means addition of oxygen to a bulk, and the term "bulk" is used in order to clarify that oxygen is added not only to a surface of a film but also to the inside of the film. In addition, "oxygen doping" includes "oxygen plasma doping" in which plasmatized oxygen is added to a bulk.

Treatment for supplying oxygen is performed on the insulating layer having a function as a gate insulating layer, so that a region where the proportion of oxygen is higher than that of the stoichiometry is formed in the insulating layer having a function as a gate insulating layer. Providing such a region allows oxygen to be supplied to the oxide semiconductor layer, and accordingly, oxygen deficiency defects in the oxide semiconductor layer or the interface between the oxide semiconductor film and the second metal oxide film can be reduced.

For example, in the case where an aluminum gallium oxide layer is used as the insulating layer having a function as a gate insulating layer, treatment for supplying oxygen such as oxygen doping treatment is performed; thus, the composition of aluminum gallium oxide can be $Ga_xAl_{2-x}O_{3+a}$ $(0<x<2, 0<a<1)$.

Note that a mixed gas containing an inert gas (e.g., nitrogen or a rare gas such as argon) and oxygen may be introduced during the deposition of the insulating layer having a function as a gate insulating layer by a sputtering method in order to supply oxygen thereto, whereby the oxygen excessive region may be formed in the insulating layer. Note that after the deposition by a sputtering method, heat treatment may be performed.

The oxide semiconductor layers (the oxide semiconductor layer 713, the oxide semiconductor layer 723, the oxide semiconductor layer 733, and the oxide semiconductor layer 743) have a function as a channel formation layer of the transistor. As an oxide semiconductor which can be used for the oxide semiconductor layer, a quaternary metal oxide (an In—Sn—Ga—Zn-based metal oxide, or the like), a ternary metal oxide (an In—Ga—Zn-based metal oxide, an In—Sn—Zn-based metal oxide, an In—Al—Zn-based metal oxide, a Sn—Ga—Zn-based metal oxide, an Al—Ga—Zn-based metal oxide, a Sn—Al—Zn-based metal oxide, or the like), and a binary metal oxide (an In—Zn-based metal oxide, a Sn—Zn-based metal oxide, an Al—Zn-based metal oxide, a Zn—Mg-based metal oxide, a Sn—Mg-based metal oxide, an In—Mg-based metal oxide, an In—Ga-based metal oxide, an In—Sn-based metal oxide, or the like), or the like can be given. An In-based metal oxide, a Sn-based metal oxide, a Zn-based metal oxide, or the like can be used as the oxide semiconductor. Further, as an oxide semiconductor, an oxide semiconductor including silicon oxide ($SiO_2$) in the above described metal oxides also can be used. Note that the oxide semiconductor may be amorphous or crystallized partly or entirely. When a crystalline oxide semiconductor is used as the oxide semiconductor, the oxide semiconductor is preferably formed over a level (flat) surface. Specifically, the oxide semiconductor is preferably formed over a surface whose average surface roughness (Ra) is 1 nm or less, further preferably 0.3 nm or less. Ra can be measured using an atomic force microscope (AFM).

A material represented by $InMO_3(ZnO)_m$ (m>0) can be used as the oxide semiconductor. Here, M represents one or more metal elements selected from Sn, Zn, Ga, Al, Mn, and Co. For example, M can be Ga, Ga and Al, Ga and Mn, Ga and Co, or the like.

The conductive layers (the conductive layer 715, the conductive layer 716, the conductive layer 725, the conductive layer 726, the conductive layer 735, the conductive layer 736, the conductive layer 745, and the conductive layer 746) have a function as a source or a drain of the transistor. These conductive layers can be, for example, a layer of a metal such as aluminum, chromium, copper, tantalum, titanium, molybdenum, or tungsten; or an alloy containing the metal as a main component.

For example, as the conductive layer having a function as the source or the drain of the transistor, a stacked layer of a layer of a metal such as aluminum or copper, and a layer of a high-melting-point metal such as titanium, molybdenum, or tungsten is used. Alternatively, a plurality of layers of a high-melting-point metal with a layer of a metal such as aluminum or copper provided therebetween are used. Heat resistance of the transistor can be improved by using an aluminum layer to which an element for preventing generation of hillocks and whiskers (e.g., silicon, neodymium, or scandium) is added as the above conductive layer.

As a material of the conductive layer, indium oxide ($In_2O_3$), tin oxide ($SnO_2$), zinc oxide (ZnO), a mixed oxide of indium oxide and tin oxide ($In_2O_3$—$SnO_2$, abbreviated as ITO), a mixed oxide of indium oxide and zinc oxide ($In_2O_3$—ZnO), or such a metal oxide containing silicon oxide can be used, for example.

The insulating layer 727 has a function as a layer for protecting a channel formation layer of the transistor (also referred to as a channel protective layer).

As an example, an oxide insulating layer such as a silicon oxide layer is used for the oxide insulating layer 717 and the oxide insulating layer 737.

As an example, an inorganic insulating layer such as a silicon nitride layer, an aluminum nitride layer, a silicon nitride oxide layer, or an aluminum nitride oxide layer is used for the protective insulating layer 719, the protective insulating layer 729, and the protective insulating layer 739.

Figure 12A:
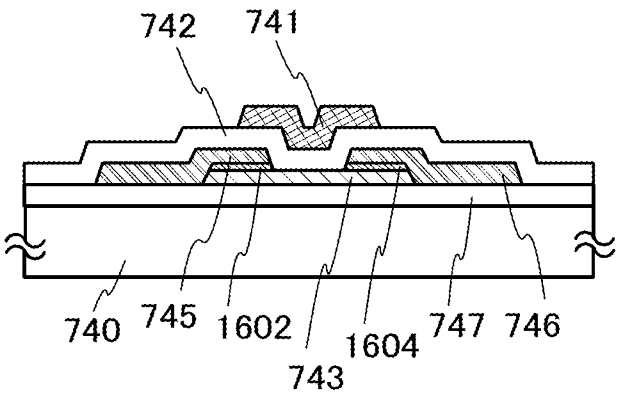
FIGS. 12A and 12B each illustrate an example of a transistor.
Figure 12B:
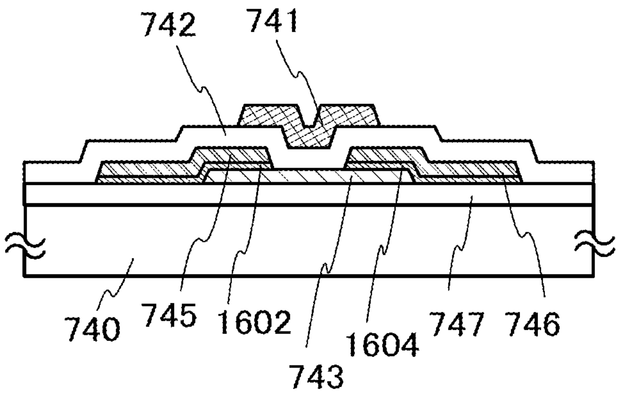

An oxide conductive layer functioning as a source region and a drain region may be provided as a buffer layer between the oxide semiconductor layer 743 and the conductive layer 745 and between the oxide semiconductor layer 743 and the conductive layer 746. FIGS. 12A and 12B each illustrate a transistor in which an oxide conductive layer is provided for the transistor in FIG. 7D.

In each of transistors in FIGS. 12A and 12B, an oxide conductive layer 1602 and an oxide conductive layer 1604 which function as a source region and a drain region are formed between the oxide semiconductor layer 743 and the conductive layers 745 and 746 which function as the source and the drain. The transistors in FIGS. 12A and 12B are examples which differ in shapes of the oxide conductive layer 1602 and the oxide conductive layer 1604 from each other due to a manufacturing process.

In a transistor in FIG. 12A, the oxide conductive layer 1602 and the oxide conductive layer 1604 which function as the source region and the drain region are formed as follows. A stack of an oxide semiconductor film and an oxide conductive film is formed. The stack of the oxide semiconductor film and the oxide conductive film is processed by the same photolithography process to form the island-shaped oxide semiconductor layer 743 and an island-shaped oxide conductive film. Then, the conductive layer 745 and the conductive layer 746 which function as the source and the drain are formed over the oxide semiconductor layer 743 and the oxide conductive film. After that, the island-shaped oxide conductive film is etched using the conductive layer 745 and the conductive layer 746 as masks.

In the transistor in FIG. 12B, an oxide conductive film is formed over the oxide semiconductor layer 743, a metal conductive film is formed thereover, and the oxide conductive film and the metal conductive film are processed by the same photolithography process. Accordingly, the oxide conductive layer 1602 and the oxide conductive layer 1604, which function as the source region and the drain region, and the conductive layer 745 and the conductive layer 746, which function as the source and the drain, are formed.

Note that in the etching treatment for processing the shape of the oxide conductive layer, etching conditions (such as the kind of etchant, the concentration, and the etching time) are adjusted as appropriate so that the oxide semiconductor layer is not excessively etched.

As the formation method of the oxide conductive layers 1602 and 1604, a sputtering method, a vacuum evaporation method (an electron beam evaporation method or the like), an arc discharge ion plating method, or a spray method can be used. As a material of the oxide conductive layer, zinc oxide, zinc aluminum oxide, zinc aluminum oxynitride, gallium zinc oxide, indium tin oxide, or the like can be used. In addition, the above materials may contain silicon oxide.

By providing the oxide conductive layer as the source region and the drain region between the oxide semiconductor layer 743 and the conductive layers 745 and 746, which function as the source and the drain, reduction in resistance in the source region and the drain region can be achieved and the transistor can operate at high speed.

Further, the withstand voltage of the transistor can be increased with the oxide semiconductor layer 743, an oxide conductive layer (the oxide conductive layer 1602 or the oxide conductive layer 1604) which functions as the drain region, and a conductive layer (the conductive layer 745 or the conductive layer 746) which functions as the drain.

Embodiment 3

Figure 13A:
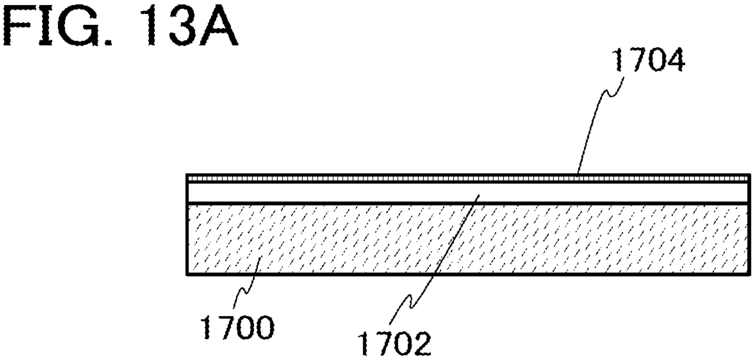
FIGS. 13A to 13C each illustrate an example of an oxide semiconductor layer.
Figure 13B:
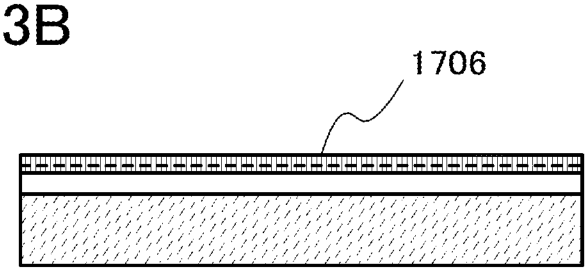

An example of an oxide semiconductor layer which can be used as the semiconductor layer of the transistor according to the above-mentioned embodiment is described with reference to FIGS. 13A to 13C.

An oxide semiconductor layer in this embodiment has a stacked structure in which a second crystalline oxide semiconductor layer which is thicker than a first crystalline oxide semiconductor layer is provided over the first crystalline oxide semiconductor layer.

An insulating layer 1702 is formed over an insulating layer 1700. In this embodiment, an oxide insulating layer with a thickness of larger than or equal to 50 nm and smaller than or equal to 60 nm is formed as the insulating layer 1702 by PCVD or sputtering. For example, a single layer or a stacked layer of a silicon oxide film, a gallium oxide film, an aluminum oxide film, a silicon nitride film, a silicon oxynitride film, an aluminum oxynitride film, or a silicon nitride oxide film can be used.

Then, a first oxide semiconductor film with a thickness of larger than and equal to 1 nm and smaller than or equal to 10 nm is formed over the insulating layer 1702. The first oxide semiconductor film is formed by sputtering and a substrate temperature at the time of forming the film is higher than or equal to 200° C. and lower than or equal to 400° C.

In this embodiment, the first oxide semiconductor film is formed to a thickness of 5 nm in an oxygen atmosphere, an argon atmosphere, or a mixed atmosphere of argon and oxygen as a sputtering gas under conditions that a target for an oxide semiconductor (a target for an In—Ga—Zn-based oxide semiconductor containing $In_2O_3$, $Ga_2O_3$, and ZnO at 1:1:2 [molar ratio]) is used, the distance between the substrate and the target is 170 mm, the substrate temperature is 250° C., the pressure is 0.4 Pa, and the direct current (DC) power is 0.5 kW. An In—Sn—Zn-based oxide semiconductor can be referred to as ITZO. In the case where an ITZO thin film is used as the oxide semiconductor film, a target for formation of a film of ITZO by a sputtering method may have a composition ratio of In:Sn:Zn=1:2:2, In:Sn:Zn=2:1:3, In:Sn:Zn=1:1:1, or In:Sn:Zn=20:45:35 in an atomic ratio, for example.

Next, an atmosphere of a chamber in which a substrate is placed is changed to a nitrogen atmosphere or a dry air and then first heat treatment is performed. The temperature of the first heat treatment is higher than or equal to 400° C. and lower than or equal to 750° C. A first crystalline oxide semiconductor layer 1704 is formed by the first heat treatment (see FIG. 13A).

The first heat treatment causes crystallization from a film surface and crystal grows from the film surface toward the inside of the film; thus, c-axis aligned crystal is obtained. By the first heat treatment, zinc and oxygen are concentrated at the film surface, and one or more layers of graphen-type two-dimensional crystal including zinc and oxygen and having a hexagonal upper plane are formed at the outermost surface; the layer(s) at the outermost surface grows in the thickness direction to form a stack of layers. By increasing the temperature of the heat treatment, crystal growth proceeds from the surface to the inside and further from the inside to the bottom.

By the first heat treatment, oxygen in the insulating layer 1702 that is an oxide insulating layer is diffused to an interface between the insulating layer 1702 and the first crystalline oxide semiconductor layer 1704 or the vicinity of the interface (within ±5 nm from the interface), whereby oxygen deficiency in the first crystalline oxide semiconductor layer 1704 is reduced. Therefore, it is preferable that oxygen be included in (in a bulk of) the insulating layer 1702 used as a base insulating layer or at the interface between the first crystalline oxide semiconductor layer 1704 and the insulating layer 1702 at an amount that exceeds at least the stoichiometric composition ratio.

Next, a second oxide semiconductor layer with a thickness more than 10 nm is formed over the first crystalline oxide semiconductor layer 1704. The second oxide semiconductor layer is formed by sputtering, and the substrate temperature in the film formation is set to be higher than or equal to 200° C. and lower than or equal to 400° C. The film formation at the substrate temperature higher than or equal to 200° C. and lower than or equal to 400° C. allows the oxide semiconductor layer formed over the surface of the first crystalline oxide semiconductor layer to have an ordered morphology.

In this embodiment, the second oxide semiconductor layer is formed to a thickness of 25 nm in an oxygen atmosphere, an argon atmosphere, or a mixed atmosphere of argon and oxygen as a sputtering gas under conditions where a target for deposition of an oxide semiconductor (a target for deposition of an In—Ga—Zn-based oxide semiconductor including $In_2O_3$, $Ga_2O_3$, and ZnO at 1:1:2 [molar ratio]) is used, the distance between the substrate and the target is 170 mm, the substrate temperature is 400° C., the pressure is 0.4 Pa, and the direct current (DC) power is 0.5 kW.

Next, second heat treatment is performed under a condition where the atmosphere of a chamber in which the substrate is set is an atmosphere of nitrogen or dry air. The temperature of the second heat treatment is higher than or equal to 400° C. and lower than or equal to 750° C. Through the second heat treatment, a second crystalline oxide semiconductor layer 1706 is formed (see FIG. 13B). The second heat treatment is performed in a nitrogen atmosphere, an oxygen atmosphere, or a mixed atmosphere of nitrogen and oxygen, whereby the density of the second crystalline oxide semiconductor layer is increased and the number of defects therein is reduced. By the second heat treatment, crystal growth proceeds in the thickness direction with the use of the first crystalline oxide semiconductor layer 1704 as a nucleus, that is, crystal growth proceeds from the bottom to the inside; thus, the second crystalline oxide semiconductor layer 1706 is formed.

It is preferable that steps from the formation of the insulating layer 1702 to the second heat treatment be successively performed without exposure to the ambient atmosphere. The steps from the formation of the insulating layer 1702 to the second heat treatment are preferably performed in an atmosphere which is controlled to include little hydrogen and moisture (such as an inert gas atmosphere, a reduced-pressure atmosphere, or a dry-air atmosphere); in terms of moisture, for example, a dry nitrogen atmosphere with a dew point of −40° C. or lower, preferably a dew point of −50° C. or lower may be employed.

Figure 13C:
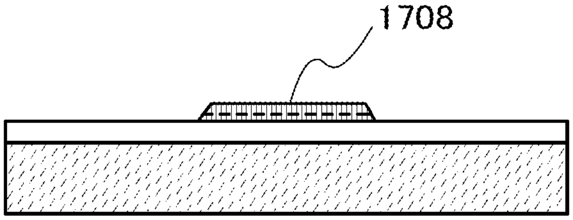

Next, the stack of the oxide semiconductor layers, the first crystalline oxide semiconductor layer 1704 and the second crystalline oxide semiconductor layer 1706, is processed into an island-shaped oxide semiconductor layer 1708 including the stack of the oxide semiconductor layers (see FIG. 13C). In FIG. 13C, the interface between the first crystalline oxide semiconductor layer 1704 and the second crystalline oxide semiconductor layer 1706 are indicated by a dotted line, and the first crystalline oxide semiconductor layer 1704 and the second crystalline oxide semiconductor layer 1706 are illustrated as a stack of oxide semiconductor layers; however, the interface is actually not distinct and is illustrated for easy understanding.

The stack of the oxide semiconductor layers can be processed by being etched after a mask having a desired shape is formed over the stack of the oxide semiconductor layers. The mask can be formed by a method such as photolithography. Alternatively, the mask may be formed by a method such as an ink-jet method.

For the etching of the stack of the oxide semiconductor layers, either dry etching or wet etching may be employed. Needless to say, both of them may be employed in combination.

A feature of the first crystalline oxide semiconductor layer and the second crystalline oxide semiconductor layer obtained by the above formation method is that they have c-axis alignment. Note that the first crystalline oxide semiconductor layer and the second crystalline oxide semiconductor layer have neither a single crystal structure nor an amorphous structure and are crystalline oxide semiconductors having c-axis alignment (also referred to as c-axis aligned crystalline (CAAC) oxide semiconductors). The first crystalline oxide semiconductor layer and the second crystalline oxide semiconductor layer partly include a crystal grain boundary.

Note that as a metal oxide which can be used for the first crystalline oxide semiconductor layer and the second crystalline oxide semiconductor layer, four-component metal oxides such as an In—Al—Ga—Zn—O-based metal oxide, an In—Al—Ga—Zn—O-based metal oxide, an In—Si—Ga—Zn—O-based metal oxide, an In—Ga—B—Zn—O-based metal oxide, and an In—Sn—Ga—Zn—O-based metal oxide; three-component metal oxides such as an In—Ga—Zn—O-based metal oxide, an In—Al—Zn—O-based metal oxide, an In—Sn—Zn—O-based metal oxide, an In—B—Zn—O-based metal oxide, a Sn—Ga—Zn—O-based metal oxide, an Al—Ga—Zn—O-based metal oxide, and a Sn—Al—Zn—O-based metal oxide; two-component metal oxides such as an In—Zn—O-based metal oxide, a Sn—Zn—O-based metal oxide, an Al—Zn—O-based metal oxide, and a Zn—Mg—O-based metal oxide; and a Zn—O-based metal oxide can be given. In addition, the above materials may include silicon oxide ($SiO_2$). Here, for example, an In—Ga—Zn—O-based metal oxide means a metal oxide including indium (In), gallium (Ga), and zinc (Zn), and there is no particular limitation on the composition ratio. Further, the In—Ga—Zn—O-based metal oxide may include an element other than In, Ga, and Zn.

Without limitation to the two-layer structure in which the second crystalline oxide semiconductor layer is formed over the first crystalline oxide semiconductor layer, a stacked structure including three or more layers may be formed by repeating film formation treatment and heat treatment after the second crystalline oxide semiconductor layer is formed.

The oxide semiconductor layer 1708 including the stack of the oxide semiconductor layers formed by the above formation method can be used for a transistor (e.g., the transistors described in Embodiment 1 and Embodiment 2) which can be applied to a semiconductor device disclosed in this specification.

Note that the transistors shown in FIG. 7C and FIG. 7D of Embodiment 2 have a structure in which carriers flow at an interface of the oxide semiconductor layer which is close to the gate and is in contact with the souce and drain. In other words, current does not flow in the thickness direction (from one surface to the other surface; specifically, in the vertical direction in FIG. 7D) of the oxide semiconductor layer, but mainly flows along one of the interfaces of the oxide semiconductor layer; therefore, even when the transistor is applied with an external stress such as light, BT (bias temperature), and the like, deterioration of transistor characteristics is suppressed or reduced.

By forming a transistor with the use of a stack of a first crystalline oxide semiconductor layer and a second crystalline oxide semiconductor layer, like the oxide semiconductor layer 1708, the transistor can have stable electric characteristics and high reliability.

Embodiment 4

In this embodiment, an example of a protection circuit of the liquid crystal display device described in Embodiment 1 is explained with reference to FIGS. 11A to 11G.

Figure 11A:
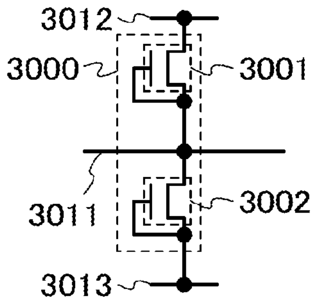
FIGS. 11A to 11G each illustrate an example of a protection circuit.

As a protection circuit, a protection circuit 3000 illustrated in FIG. 11A may be used. The protection circuit 3000 is provided to prevent breakdown of elements or the like due to electro-static discharge (ESD) which are included in a pixel provided in the pixel portion 100 electrically connected to a wiring 3011. The protection circuit 3000 includes a transistor 3001 and a transistor 3002.

A first terminal of the transistor 3001 is connected to a wiring 3012, a second terminal of the transistor 3001 is electrically connected to the wiring 3011, and a gate of the transistor 3001 is electrically connected to the wiring 3011. A first terminal of the transistor 3002 is connected to a wiring 3013, a second terminal of the transistor 3002 is connected to the wiring 3011, and a gate of the transistor 3002 is connected to the wiring 3013.

When a potential of the wiring 3011 is between the low power supply potential (VSS) and the high power supply potential (VDD), the transistor 3001 and the transistor 3002 are turned off. Thus, a signal supplied to the wiring 3011 is supplied to the pixel which is connected to the wiring 3011.

Note that due to an adverse effect of static electricity, a potential which is higher than the high power supply potential (VDD) or a potential which is lower than the low power supply potential (VSS) is supplied to the wiring 3011 in some cases. In this case, the element in the pixel which is connected to the wiring 3011 might be broken by the potential which is higher than the high power supply potential (VDD) or the potential which is lower than the low power supply potential (VSS).

However, the transistor 3001 is turned on in the case where the static electricity exerts a potential higher than the high power supply potential (VDD) on the wiring 3011. Since electric charge accumulated in the wiring 3011 is transferred to the wiring 3012 through the transistor 3001, the potential of the wiring 3011 is lowered. On the other hand, the transistor 3002 is turned on in the case where the static electricity exerts a potential which is lower than the high power supply potential (VSS) on the wiring 3011. Since the electric charge accumulated in the wiring 3011 is transferred to the wiring 3013 through the transistor 3002, the potential of the wiring 3011 is raised. Accordingly, the electrostatic destruction can be prevented.

In other words, by providing the protection circuit 3000 as described above, electrostatic destruction of the element included in the pixel connected to the wiring 3011 can be prevented.

Figure 11B:
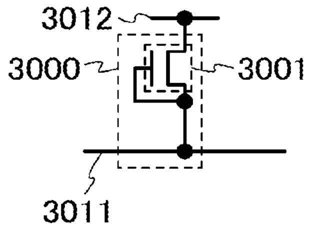
Figure 11C:
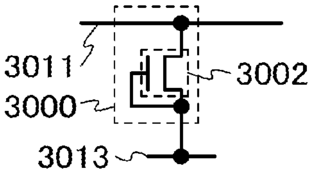

Further, as a protection circuit, the protection circuits 3000 in FIG. 11B and FIG. 11C may be used. FIG. 11B illustrates a structure in which the transistor 3002 and the wiring 3013 are omitted from the structure in FIG. 11A. FIG. 11C illustrates a structure in which the transistor 3001 and the wiring 3012 are omitted from the structure in FIG. 11A.

Figure 11D:
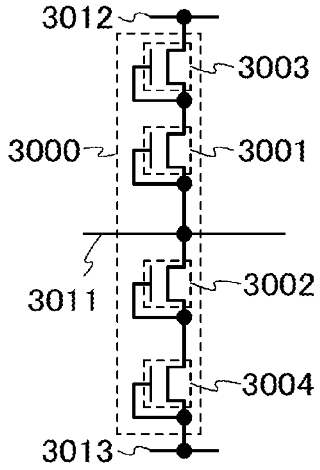

Moreover, as a protection circuit, the protection circuit 3000 in FIG. 11D may be used. FIG. 11D illustrates a structure in which a transistor 3003 is connected in series between the wiring 3012 and the transistor 3001 of the structure in FIG. A, and the transistor 3004 is connected in series between the transistor 3002 and the wiring 3013 of the structure in FIG. A.

In FIG. 11D, a first terminal of the transistor 3003 is connected to the wiring 3012, a second terminal of the transistor 3003 is connected to the first terminal of the transistor 3001, and a gate of the transistor 3003 is connected to the first terminal of the transistor 3001. A first terminal of the transistor 3004 is connected to the wiring 3013, a second terminal of the transistor 3004 is connected to the first terminal of the transistor 3002, and a gate of the transistor 3004 is connected to the wiring 3013.

Figure 11E:
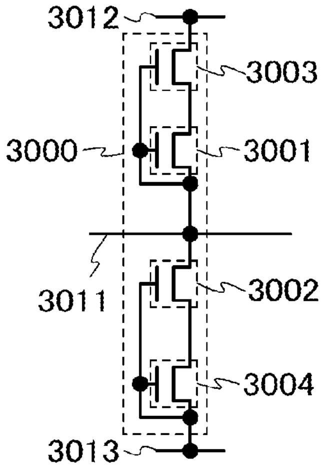

Furthermore, as a protection circuit, the protection circuit 3000 in FIG. 11E may be used. FIG. 11E illustrates a structure in which the gate of the transistor 3003 of the structure in FIG. D is not connected to the first terminal of the transistor 3001 but is connected to the gate of the transistor 3003, and the gate of the transistor 3002 of the structure in FIG. D is not connected to the second terminal of the transistor 3004 but is connected to the gate of the transistor 3004.

Figure 11F:
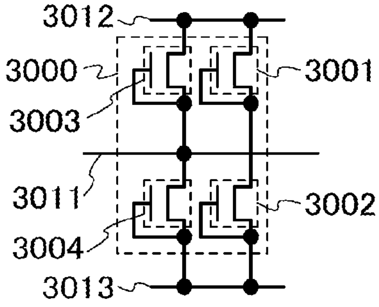

Further, as a protection circuit, the protection circuit 3000 in FIG. 11F may be used. FIG. 11F illustrates a structure in which transistors are connected in parallel between the wiring 3011 and the wiring 3012 of the structure in FIG. 11A, and transistors are connected in parallel between the wiring 3011 and the wiring 3013 of the structure in FIG. 11A. In FIG. 11F, the first terminal of the transistor 3003 is connected to the wiring 3012, the second terminal of the transistor 3003 is connected to the wiring 3011, and the gate of the transistor 3003 is connected to the wiring 3011. Further, the first terminal of the transistor 3004 is connected to the wiring 3013, the second terminal of the transistor 3004 is connected to the wiring 3011, and the gate of the transistor 3004 is connected to the wiring 3013.

Figure 11G:
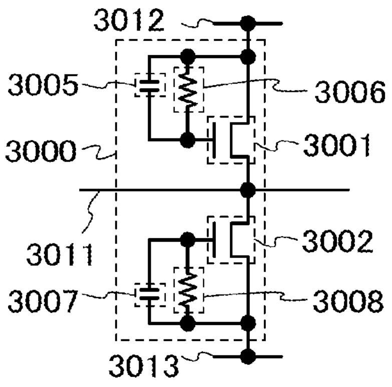

Furthermore, as a protection circuit, the protection circuit 3000 in FIG. 11G may be used. FIG. 11G illustrates a structure in which a capacitor 3005 and a resistor 3006 are connected in parallel between the gate of the transistor 3001 and the first terminal of the transistor 3001 of the structure in FIG. 11A, and a capacitor 3007 and a resistor 3008 are connected in parallel between the gate of the transistor 3002 and the first terminal of the transistor 3002 of the structure in FIG. 11A.

Thus, breakage or degradation of the protection circuit 3000 itself can be prevented by using the structure in FIG. 11G.

For example, in the case where a voltage which is higher than power supply voltage is supplied to the wiring 3011, the gate-source voltage (Vgs) of the transistor 3001 is raised. Thus, the transistor 3001 is turned on, so that the voltage of the wiring 3011 is lowered. However, since high voltage is applied between the gate of the transistor 3001 and the second terminal of the transistor 3001, the transistor might be damaged or deteriorate. In order to prevent damage or deterioration of the transistor, a gate voltage of the transistor 3001 is increased by using the capacitor 3005 so that the gate-source voltage (Vgs) of the transistor 3001 is lowered. Specifically, when the transistor 3001 is turned on, a potential of the first terminal of the transistor 3001 is increased instantaneously. Then, with capacitive coupling of the capacitor 3005, the potential of the gate of the transistor 3001 is increased. In this manner, the gate-source voltage (Vgs) of the transistor 300 can be lowered so that breakage or deterioration of the transistor 3001 can be suppressed.

Similarly, in the case where a voltage which is lower than the power supply potential is supplied to the wiring 3011, a voltage of the first terminal of the transistor 3002 is lowered instantaneously. Then, with capacitive coupling of the capacitor 3007, the voltage of the gate of the transistor 3002 is lowered. In this manner, the gate-source voltage (Vgs) of the transistor 3002 can be lowered, so that breakage or deterioration of the transistor 3002 can be suppressed.

Embodiment 5

In this embodiment, electronic paper including the liquid crystal display device described in Embodiment 1 will be explained.

Electronic paper described in this embodiment can be used for electronic appliances of a variety of fields as long as they can display data. As an electronic device including electronic paper, an e-book reader (e-book), a poster, a transportation advertisement in a means for vehicles such as a train and a bus, various cards with display portions such as a credit card, and the like can be given. An example of an electronic device including electronic paper is described with reference to FIGS. 8A and 8B and FIG. 9.

Figure 8A:
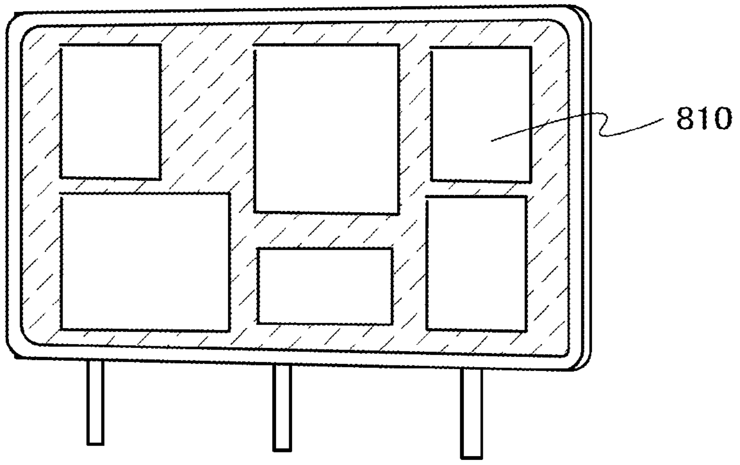
FIGS. 8A and 8B each illustrate an example of an electronic device.

FIG. 8A illustrates an example of a poster using electronic paper. A poster 810 can be posted on a wall, a pillar, and the like regardless of whether outdoors or indoors.

In the case where an advertising medium is printed paper, the advertisement needs to be replaced by hand for exchanging the advertised contents. On the other hand, in the case where the poster 810 including the liquid crystal display device described in Embodiment 1 is used as an advertising medium, the advertised contents can be replaced by changing the content displayed on the poster 810 without replacing the poster 810 itself.

Further, data may be transmitted or received wirelessly to/from the poster 810, so that the advertised contents can be replaced wirelessly.

In the poster including the liquid crystal display device described in Embodiment 1, the liquid crystal element can hold the image signal (Video Data) by suppression of reduction in potential of the data line even when a transistor in the protection circuit is degraded. Accordingly, stable image display can be performed.

Further, in the poster including the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a poster, power consumption of image display or the like can be reduced and eye fatigue of a user looking at the poster can be suppressed.

Figure 8B:
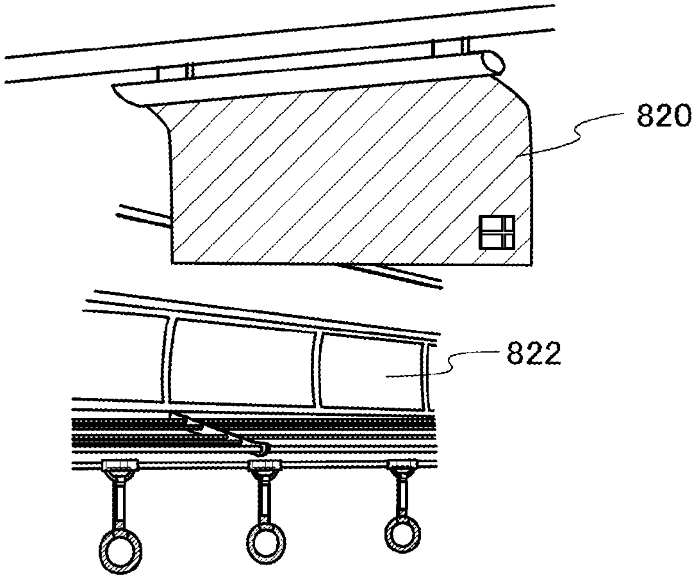

Further, FIG. 8B illustrates an example of a car card advertisement formed using electronic paper. A car card advertisement is an advertisement in vehicles such as a train and a bus. A hanging poster 820 and a poster 822 above the window can be given as advertisements. Here, the hanging poster 820 is an advertising medium hanging on the center of the ceiling in cars. The poster 822 above the window is an advertising medium positioned such that a standing passenger naturally sees.

In the case where an advertising medium is printed paper, the advertisement needs to be replaced by hand for exchanging the advertised contents. On the other hand, in the case where the hanging poster 820, the poster 822 above the window, or the like including the liquid crystal display device described in Embodiment 1 is used as an advertising medium, the advertised contents are can be replaced by changing the content displayed on the advertisement without the advertisement itself replaced.

Further, data may be transmitted or received wirelessly to/from the hanging poster 820 or the poster 822 above the window, so that the advertised contents can be replaced wirelessly.

In the advertisement such as a hanging poster or a poster on an upper side wall including the liquid crystal display device described in Embodiment 1, the liquid crystal element can hold the image signal (Video Data) by suppression of reduction in potential of the data line even when a transistor in the protection circuit is degraded. Accordingly, stable image display can be performed.

Further, in the advertisement such as a hanging poster or a poster on an upper side wall including the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for an advertisement such as a hanging poster or a poster on an upper side wall, power consumption of image display or the like can be reduced and eye fatigue of a user looking at the advertisement can be suppressed.

Figure 9:
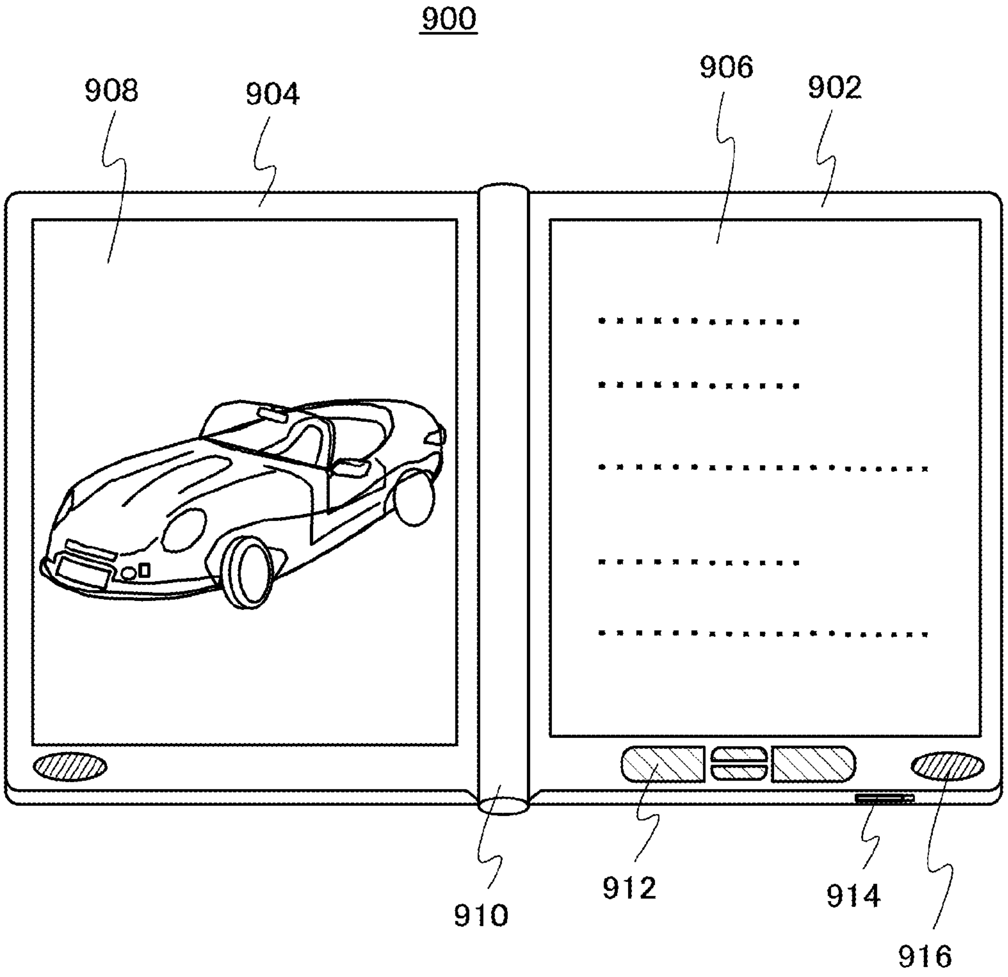
FIG. 9 illustrates an example of an electronic device.

FIG. 9 illustrates an example of an e-book reader.

An e-book reader 900 includes two housings (a housing 902 and a housing 904). The housing 902 and the housing 904 are combined with a hinge 910 so that the e-book reader 900 can be opened and closed with the hinge 910 as an axis. With such a structure, the e-book reader 900 can operate like a paper book.

A display portion 906 is incorporated in the housing 902. A display portion 908 is incorporated in the housing 904. The display portions 906 and 908 may display one image or different images. According to the structure where different images are displayed in different display portions, for example, text can be displayed on the right display portion (the display portion 906 in FIG. 9) and images can be displayed on the left display portion (the display portion 908 in FIG. 9).

Further, the housing 902 of the e-book reader 900 is provided with an operation portion including an operation key 912 and the like, a power switch 914, a speaker 916, and the like. With the operation key 912, pages can be turned. Note that a keyboard, a pointing device, or the like may be provided on the surface of the housing, on which the display portion is provided. Further, an external connection terminal (an earphone terminal, a USB terminal, a terminal that can be connected to an AC adapter and various cables such as a USB cable, or the like), a recording medium insert portion, or the like may be provided on the back surface or the side surface of the housing 902 or the housing 904. Further, the e-book reader 900 may have a function of an electronic dictionary.

The e-book reader 900 may have a structure capable of wirelessly transmitting and receiving data. With such as structure, a desired book data or the like is purchased and downloaded from an e-book server wirelessly.

In the e-book reader including the liquid crystal display device described in Embodiment 1, the liquid crystal element can hold the image signal (Video Data) by suppression of reduction in potential of the data line even when a transistor in the protection circuit is degraded. Accordingly, stable image display can be performed.

Further, in the e-book reader including the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for an e-book reader, power consumption of image display or the like can be reduced and eye fatigue of a user can be less severe.

Embodiment 6

In this embodiment, electronic devices including the liquid crystal display device described in the above embodiment in their display portions are described.

By applying the liquid crystal display device described in Embodiment 1 to display portions of a variety of electronic devices, a variety of functions in addition to a display function can be provided for the electronic devices. Examples of the electronic devices are a television device (also referred to as a television or a television receiver), a display of a computer or the like, a notebook personal computer, a camera such as a digital camera or a digital video camera, a digital photo frame, a mobile phone (also referred to as a mobile telephone or a mobile phone device), a portable game console, a digital assistant, an information guide terminal, an audio reproducing device, and the like. An example of the electronic device is described with reference to FIGS. 10A to 10F.

Figure 10A:
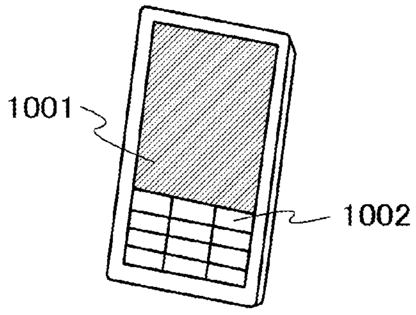
FIGS. 10A to 10F each illustrate an example of an electronic device.

FIG. 10A illustrates an example of a personal digital assistant.

The personal digital assistant illustrated in FIG. 10A includes at least a display portion 1001. The personal digital assistant illustrated in FIG. 10A can be combined with a touch panel or the like, and can be used as an alternative to a variety of portable objects. As illustrated in FIG. 10A, a personal digital assistant can be used as a cell phone by providing an operation portion 1002 with the personal digital assistant, for example. Note that an operation button may be provided instead of the operation portion 1002. Further, a personal digital assistant illustrated in FIG. 10A can be used as a notepad, a handy scanner provided with a text input-output function.

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of a personal digital assistant.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of a personal digital assistant.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of a personal digital assistant, power consumption of image display or the like can be reduced and eye fatigue of a user can be less severe.

Figure 10B:
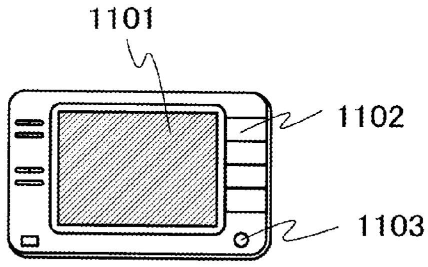

FIG. 10B illustrates an example of an information guide terminal including an automotive navigation system, for example.

An information guide terminal illustrated in FIG. 10B includes at least a display portion 1101. An information guide terminal illustrated in FIG. 10B may include an operation button 1102, an external input terminal 1103, and the like.

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of an information guide terminal.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of an information guide terminal.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of an information guide terminal, power consumption of image display or the like can be reduced and eye fatigue of a user can be less severe.

Figure 10C:
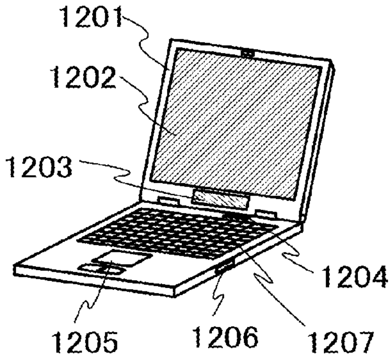

FIG. 10C illustrates an example of a notebook personal computer.

The notebook personal computer illustrated in FIG. 10C includes a housing 1201, a display portion 1202, a speaker 1203, an LED lamp 1204, a pointing device 1205, a connection terminal 1206, a keyboard 1207, and the like.

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of a personal computer.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of a personal computer.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of a personal computer, power consumption of image display or the like can be reduced and eye fatigue of a user can be less severe.

Figure 10D:
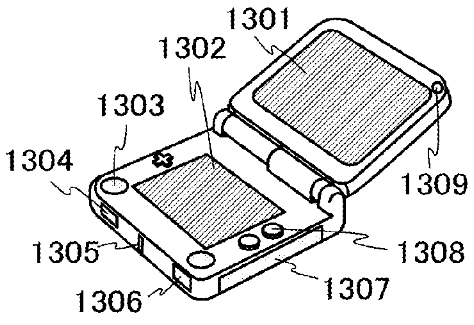

FIG. 10D illustrates an example of a portable game machine.

The portable game machine illustrated in FIG. 10D includes a first display portion 1301, a second display portion 1302, a speaker 1303, a connection terminal 1304, an LED lamp 1305, a microphone 1306, a recording medium reading portion 1307, an operation button 1308, a sensor 1309, and the like.

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of a portable game machine.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of a portable game machine.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of a portable game machine, power consumption of image display or the like can be reduced and eye fatigue of a user can be less severe.

Further, a moving image can be displayed on one of the display portions (the first display portion 1301 and the second display portion 1302) while a still image can be displayed on the other thereof. In this manner, supply of a signal to the driver can be stopped in the display portion displaying the still image, so that power consumption for image display on the display portion displaying the still image can be reduced.

Figure 10E:
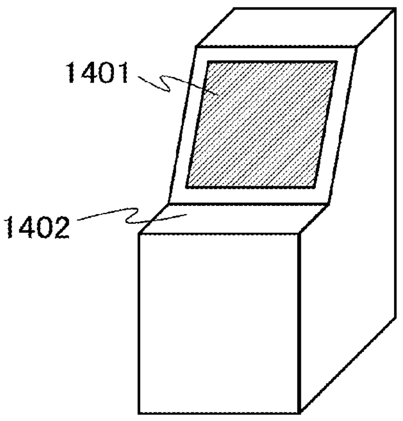

FIG. 10E illustrates an example of a stationary information terminal.

The stationary information terminal illustrated in FIG. 10E includes at least a display portion 1401. Moreover, additional operation buttons or the like may be provided for the plane portion 1402. The stationary information communication terminal illustrated in FIG. 10E can be used for an automated teller machine or an information communication terminal (also referred to as a multimedia station) for ordering information goods such as a ticket (including a coupon).

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of a stationary information terminal.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of a stationary information terminal.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of a stationary information terminal, power consumption of image display or the like can be reduced and eye fatigue of a user can be less severe.

Figure 10F:
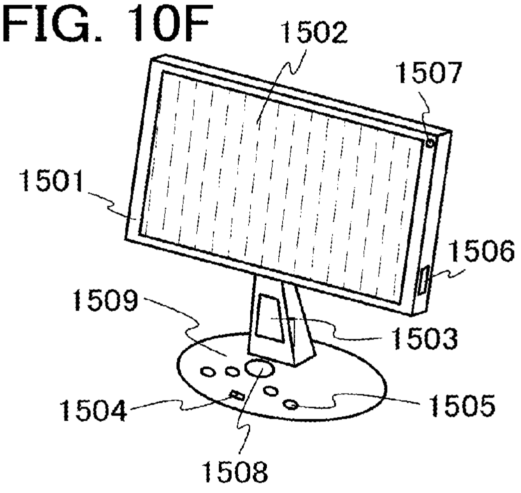

FIG. 10F illustrates an example of a display.

The display illustrated in FIG. 10F includes a housing 1501, a display portion 1502, a speaker 1503, an LED lamp 1504, an operation button 1505, a connection terminal 1506, a sensor 1507, a microphone 1508, a support base 1509, and the like.

In the liquid crystal display device described in Embodiment 1, the liquid crystal element can hold the image signal (Video Data) by suppression of reduction in potential of the data line even when a transistor in the protection circuit is degraded. Accordingly, stable image display can be performed in a display portion of a display.

Further, in the liquid crystal display device described in Embodiment 1, the liquid crystal elements corresponding to their respective data lines can hold the image signal (Video Data) by suppression of reduction in potential of the data line even when the characteristics, such as the threshold voltage, of transistors in the plurality of protection circuits of the liquid crystal display vary. Accordingly, unevenness of an image can be reduced in a display portion of a display.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of a display, power consumption of image display or the like can be reduced and eye fatigue of a user can be less severe.

By using the liquid crystal display device described in Embodiment 1 for a display portion of an electronic device, the liquid crystal element can hold the image signal (Video Data) even when a transistor in the protection circuit is degraded. Accordingly, stable image display can be performed in the display portion of the electronic device.

Further, by using the liquid crystal display device described in Embodiment 1 for a display portion of an electronic device, leakage current due to variation in characteristics of a transistor can be suppressed even in the case of using for a long time. Accordingly, stable image display can be performed in a display portion of an electronic device.

Furthermore, by using the liquid crystal display device described in Embodiment 1 for a display portion of an electronic device, the liquid crystal element can hold the image signal (Video Data) even when the characteristics, such as the threshold voltage, of transistors in the plurality of protection circuits of the liquid crystal display vary. Accordingly, unevenness of an image can be reduced in the display portion of the electronic device.

Further, in the liquid crystal display device described in Embodiment 1, time (time in which the still image display mode is performed) for displaying an image per one writing of the image signal (Video Data) is long; accordingly, the frequency of writing of the image signal (Video Data) can be reduced. Therefore, by using the liquid crystal display device for a display portion of an electronic device, power consumption of image display or the like can be reduced and eye fatigue of a user can be less severe.

This application is based on Japanese Patent Application serial no. 2010-178132 filed with Japan Patent Office on Aug. 6, 2010, the entire contents of which are hereby incorporated by reference.

What is claimed is:

1. A display device comprising:

a pixel portion comprising:

a data line; and a plurality of pixels arranged along the data line, each of the plurality of pixels comprising:

a display element comprising a pixel electrode and a common electrode; and a first transistor electrically connected to the data line and the pixel electrode;

a data driver electrically connected to the data line; and a protection circuit electrically connected to the data line, wherein the pixel portion is located between the data driver and the protection circuit, and wherein the protection circuit comprises a second transistor and a third transistor each comprising a first terminal, a second terminal, and a gate, wherein the first terminal of the second transistor is electrically connected to the gate of the second transistor, and wherein the second terminal of the second transistor is electrically connected to the data line, the first terminal of the third transistor, and the gate of the third transistor.

2. The display device according to claim 1, further comprising a first resistor and a first capacitor which are electrically connected in parallel between the first terminal of the second transistor and the gate of the second transistor.

3. The display device according to claim 1, further comprising:

a fourth transistor and a fifth transistor each comprising a first terminal, a second terminal, and a gate, wherein the first terminal of the fourth transistor is electrically connected to the first terminal of the second transistor and the gate of the fourth transistor, wherein the second terminal of the fourth transistor is electrically connected to the first terminal of the fifth transistor and the gate of the fifth transistor, and wherein the second terminal of the fifth transistor is electrically connected to the second terminal of the third transistor.

4. The display device according to claim 1, further comprising a sixth transistor electrically connected to the common electrodes.

5. The display device according to claim 1, wherein the first transistors each comprise a semiconductor layer which comprises an oxide semiconductor.

6. The display device according to claim 1, wherein the pixel portion further comprises a gate line electrically connected to at least one of the first transistors, and wherein the second terminal of the third transistor is configured to be input with a high-power supply potential which is higher than a potential applied to the common electrodes and equal to or lower than a potential applied to the gate line to turn on the first transistor.

7. The display device according to claim 6, wherein the first terminal of the second transistor is configured to be input with a low-power supply potential which is lower than the high-power supply potential, wherein the low-power supply potential is configured to be set at a first potential or a second potential which is higher than the second potential, and wherein the first potential is lower than a minimum potential input to the data line or equal to a potential applied to the gate line to turn off the first transistor.

8. The display device according to claim 1, wherein the first transistor is configured to be input with a positive signal and a negative signal alternately.

9. An electronic device comprising the display device according to claim 1.

10. A display device comprising:

a pixel portion comprising:

a data line; and a plurality of pixels arranged along the data line, each of the plurality of pixels comprising:

a display element comprising a pixel electrode and a common electrode; and a first transistor electrically connected to the data line and the pixel electrode;

a data driver electrically connected to the data line; and a protection circuit electrically connected to the data line, wherein the pixel portion is located between the data driver and the protection circuit, and wherein the protection circuit comprises a second transistor, a third transistor, a fourth transistor, and a fifth transistor, each of which comprises a first terminal, a second terminal, and a gate, wherein the first terminal of the second transistor is electrically connected to the gate of the second transistor, wherein the second terminal of the second transistor is electrically connected to the first terminal of the third transistor and the gate of the third transistor, wherein the second terminal of the third transistor is electrically connected to the data line, the first terminal of the fourth transistor, and the gate of the fourth transistor, and wherein the second terminal of the fourth transistor is electrically connected to the first terminal of the fifth transistor and the gate of the fifth transistor.

11. The display device according to claim 10, wherein the gate of the second transistor is electrically connected to the gate of the third transistor, and wherein the gate of the fourth transistor is electrically connected to the gate of the fifth transistor.

12. An electronic device comprising the display device according to claim 11.

13. The display device according to claim 10, further comprising a sixth transistor electrically connected to the common electrodes.

14. The display device according to claim 10, wherein the first transistors each comprise a semiconductor layer which comprises an oxide semiconductor.

15. The display device according to claim 10, wherein the pixel portion further comprises a gate line electrically connected to at least one of the first transistors, and wherein the second terminal of the third transistor is configured to be input with a high-power supply potential which is higher than a potential applied to the common electrodes and equal to or lower than a potential applied to the gate line to turn on the first transistor.

16. The display device according to claim 15, wherein the first terminal of the second transistor is configured to be input with a low-power supply potential which is lower than the high-power supply potential, wherein the low-power supply potential is configured to be set at a first potential or a second potential which is higher than the second potential, and wherein the first potential is lower than a minimum potential input to the data line or equal to a potential applied to the gate line to turn off the first transistor.

17. The display device according to claim 10, wherein the first transistor is configured to be input with a positive signal and a negative signal alternately.

* * * * *